(12) United States Patent
Walker et al.

(10) Patent No.: US 8,751,297 B2
(45) Date of Patent: Jun. 10, 2014

(54) METHOD AND APPARATUS FOR DEFINING ROUTING OF CUSTOMERS BETWEEN MERCHANTS

(75) Inventors: Jay S. Walker, Ridgefield, CT (US); Andrew S. Van Luchene, Norwalk, CT (US); Daniel E. Tedesco, New Canaan, CT (US); Magdalena Mik, Greenwich, CT (US); James A. Jorasch, Stamford, CT (US)

(73) Assignee: Inventor Holdings, LLC, Stamford, CT (US)

( * ) Notice: Subject to any disclaimer, the term of this patent is extended or adjusted under 35 U.S.C. 154(b) by 1029 days.

(21) Appl. No.: 12/111,637

(22) Filed: Apr. 29, 2008

(65) Prior Publication Data

US 2008/0201194 A1 Aug. 21, 2008

Related U.S. Application Data

(63) Continuation of application No. 11/399,143, filed on Apr. 6, 2006, now Pat. No. 7,496,523, which is a continuation of application No. 10/118,620, filed on Apr. 5, 2002, now Pat. No. 7,099,832, which is a continuation of application No. 09/166,405, filed on Oct. 5, 1998, now Pat. No. 6,405,174.

(51) Int. Cl.
 *G06Q 30/00* (2012.01)
(52) U.S. Cl.
 USPC .............. 705/14.3; 705/14.34; 235/380
(58) Field of Classification Search
 USPC ........................................... 705/14.16
 See application file for complete search history.

(56) References Cited

U.S. PATENT DOCUMENTS

| 4,567,609 | A | 1/1986 | Metcalf ..................... 382/9 |
| 4,603,390 | A | 7/1986 | Mehdipour et al. ........ 364/467 |
| 4,743,022 | A | 5/1988 | Wood ........................ 273/85 |
| 4,817,166 | A | 3/1989 | Gonzalez et al. ............ 382/1 |
| 4,817,990 | A | 4/1989 | Krost ....................... 283/101 |
| 4,839,507 | A | 6/1989 | May ........................ 235/381 |
| 4,876,592 | A | 10/1989 | Von Kohorn |
| 4,878,248 | A | 10/1989 | Shyu et al. ................. 382/9 |

(Continued)

FOREIGN PATENT DOCUMENTS

| EP | 0 512 509 A2 | 11/1992 |
| GB | 2 109 305 A | 6/1983 |

(Continued)

OTHER PUBLICATIONS

"U.P.C. Coupon Code Guidelines Manual," Uniform Code Council, Inc., Homepage: (www.uc-council.org/d31-3.htm), Download Date: Mar. 12, 1998, 10 pp.

(Continued)

*Primary Examiner* — Jamie Kucab
(74) *Attorney, Agent, or Firm* — Michael D. Downs; Fincham Downs, LLC

(57) ABSTRACT

A server or Internet service provider computer selects a soliciting merchant and an outputting merchant based on various factors. In one embodiment, the soliciting merchant is selected is its activity rate (e.g. sales rate) is low. The outputting merchant provides offers for bonuses to customers on behalf of the soliciting merchant. The bonus is provided to the customer in exchange for consummating a transaction with the soliciting merchant. Thus, the soliciting merchant benefits from the increased patronage such offers encourage.

58 Claims, 25 Drawing Sheets

| RULE IDENTIFIER 920 | RULE IS ACTIVE WHEN 922 | PRIORITIZATION 924 |
|---|---|---|
| R001 | CURRENT TIME > 7:00 PM | MERCHANT CLASS = RESTAURANT: PRIORITY = 1<br>MERCHANT CLASS ≠ RESTAURANT: PRIORITY = 2 |
| R002 | ALWAYS | MERCHANT CLASS = MERCHANT CLASS OF OUTPUTTING MERCHANT: PRIORITY = 1<br>MERCHANT CLASS ≠ MERCHANT CLASS OF OUTPUTTING MERCHANT: PRIORITY = 2 |
| R003 | CURRENT TIME - MOVIE START TIME < 10 MINS. | MERCHANT CLASS = MOVIE THEATER: PRIORITY = 1<br>MERCHANT CLASS ≠ MOVIE THEATER: PRIORITY = 2 |
| R004 | CURRENT MONTH = JUNE, JULY OR AUGUST AND CURRENT TEMPERATURE > 80°F | MERCHANT CLASS = ICE CREAM SHOP: PRIORITY = 1<br>MERCHANT CLASS ≠ ICE CREAM SHOP: PRIORITY = 2 |

900

(56) References Cited

U.S. PATENT DOCUMENTS

| | | | |
|---|---|---|---|
| 4,922,435 A | 5/1990 | Cahlander et al. ............ 364/513 |
| 4,963,723 A | 10/1990 | Masada ........................ 235/384 |
| 4,982,346 A | 1/1991 | Girouard et al. ............. 364/550 |
| 5,025,372 A | 6/1991 | Burton et al. ................. 364/406 |
| 5,034,739 A | 7/1991 | Gruhl ........................ 340/932.2 |
| 5,039,848 A | 8/1991 | Stoken ........................ 235/381 |
| 5,056,019 A | 10/1991 | Schultz et al. ................. 364/405 |
| 5,058,044 A | 10/1991 | Stewart et al. ............ 364/551.01 |
| 5,081,685 A | 1/1992 | Jones, III et al. ................. 382/1 |
| 5,136,658 A | 8/1992 | Mori ................................. 382/1 |
| 5,173,851 A | 12/1992 | Off et al. |
| 5,189,607 A | 2/1993 | Shirasaki et al. ............ 364/405 |
| 5,192,854 A | 3/1993 | Counts |
| 5,193,648 A | 3/1993 | Yuter .............................. 186/38 |
| 5,202,826 A | 4/1993 | McCarthy ..................... 364/405 |
| 5,204,675 A | 4/1993 | Sekine .......................... 340/933 |
| 5,256,863 A | 10/1993 | Ferguson et al. ............. 235/383 |
| 5,315,093 A | 5/1994 | Stewart ........................ 235/381 |
| 5,315,664 A | 5/1994 | Kumagai .......................... 382/1 |
| 5,325,291 A | 6/1994 | Garrett et al. ................. 364/401 |
| 5,353,218 A | 10/1994 | De Lapa et al. ............... 364/401 |
| 5,353,219 A | 10/1994 | Mueller et al. ................. 364/405 |
| 5,380,991 A | 1/1995 | Valencia et al. ............. 235/383 |
| 5,381,155 A | 1/1995 | Gerber .......................... 342/104 |
| 5,422,473 A | 6/1995 | Kamata ......................... 235/384 |
| 5,425,108 A | 6/1995 | Hwang et al. ................. 382/105 |
| 5,450,938 A | 9/1995 | Rademacher ................. 194/206 |
| 5,482,139 A | 1/1996 | Rivalto ........................... 183/36 |
| 5,537,314 A | 7/1996 | Kanter |
| 5,568,406 A | 10/1996 | Gerber .......................... 364/562 |
| 5,581,064 A | 12/1996 | Riley et al. |
| 5,591,972 A | 1/1997 | Noble et al. ................... 250/330 |
| 5,602,377 A | 2/1997 | Beller et al. |
| 5,604,901 A | 2/1997 | Kelley et al. .................. 395/603 |
| 5,612,868 A | 3/1997 | Off et al. |
| 5,621,812 A | 4/1997 | Deaton et al. ................. 382/100 |
| 5,638,302 A | 6/1997 | Gerber .......................... 364/556 |
| 5,642,484 A | 6/1997 | Harrison, III et al. ........ 395/214 |
| 5,651,075 A | 7/1997 | Frazier et al. ................. 382/105 |
| 5,655,007 A | 8/1997 | McAllister ................. 379/91.01 |
| 5,666,493 A | 9/1997 | Wojcik et al. ................... 705/26 |
| 5,687,322 A | 11/1997 | Deaton et al. |
| 5,689,100 A | 11/1997 | Carrithers et al. |
| 5,708,782 A | 1/1998 | Larson et al. ................. 395/214 |
| 5,710,557 A | 1/1998 | Schuette ..................... 340/932.2 |
| 5,710,886 A | 1/1998 | Christensen et al. ......... 395/214 |
| 5,719,396 A | 2/1998 | Jack et al. ................... 250/338.5 |
| 5,726,450 A | 3/1998 | Peterson et al. ............ 250/338.5 |
| 5,737,710 A | 4/1998 | Anthonyson ...................... 701/1 |
| 5,780,133 A | 7/1998 | Engstrom ..................... 428/40.1 |
| 5,812,769 A | 9/1998 | Graber et al. |
| 5,832,457 A | 11/1998 | O'Brien et al. ................. 705/14 |
| 5,842,178 A | 11/1998 | Giovannoli ..................... 705/26 |
| 5,842,212 A | 11/1998 | Ballurio et al. ................ 707/100 |
| 5,845,259 A | 12/1998 | West et al. |
| 5,857,175 A | 1/1999 | Day et al. ........................ 705/14 |
| 5,864,822 A | 1/1999 | Baker, III |
| 5,905,246 A | 5/1999 | Fajkowski ..................... 235/375 |
| 5,923,016 A | 7/1999 | Fredregill et al. |
| 5,924,080 A | 7/1999 | Johnson ........................... 705/26 |
| 5,937,391 A | 8/1999 | Ikeda et al. |
| 5,938,717 A | 8/1999 | Dunne et al. .................. 701/117 |
| 5,948,038 A | 9/1999 | Daly et al. ..................... 701/117 |
| 5,956,695 A | 9/1999 | Carrithers et al. |
| 5,974,399 A | 10/1999 | Giuliani et al. ................. 705/14 |
| 5,991,740 A | 11/1999 | Messer |
| 5,995,942 A | 11/1999 | Smith et al. |
| 5,999,914 A | 12/1999 | Blinn et al. |
| 6,014,634 A | 1/2000 | Scroggie et al. |
| 6,016,504 A | 1/2000 | Arnold et al. |
| 6,026,370 A | 2/2000 | Jermyn ........................... 705/14 |
| 6,026,375 A | 2/2000 | Hall et al. ....................... 705/26 |
| 6,029,139 A | 2/2000 | Cunningham et al. |
| 6,029,141 A | 2/2000 | Bezos et al. |
| 6,058,373 A | 5/2000 | Blinn et al. |
| 6,061,660 A | 5/2000 | Eggleston et al. |
| 6,101,485 A | 8/2000 | Fortenberry et al. |
| 6,182,050 B1 * | 1/2001 | Ballard ...................... 705/14.61 |
| 6,405,174 B1 | 6/2002 | Walker et al. |
| 6,584,448 B1 | 6/2003 | Laor |
| 6,810,304 B1 * | 10/2004 | Dickson ........................ 700/241 |
| 2002/0120496 A1 | 8/2002 | Scroggie et al. |
| 2003/0139969 A1 | 7/2003 | Scroggie et al. |

FOREIGN PATENT DOCUMENTS

| | | |
|---|---|---|
| WO | WO 97/50064 | 12/1997 |
| WO | WO 98/06050 | 12/1998 |
| WO | WO 98/28699 | 12/1998 |
| WO | PCT/US 99/21720 | 3/2000 |

OTHER PUBLICATIONS

Information Packet: "My Points®—Universal Rewards Currency," MotivationNet, Inc., Apr. 1998, 29 pp.

"Global Second-Generation, and Frequent Buyer Set New Trends", Marketing News, Jun. 7, 1985, vol. 19, No. 12, p. 18 ISSN:0025-3790, 1 pg.

McIntyre, Faye, "Small business may prefer alternatives to advertising.", South Dakota Business Review, Jun. 1989, vol. 47, No. 4, pp.

Arend, Mark, "Debit Frenzy? Not quite, but getting there", ABA Bank Journal, Apr. 1994, vol. 86, No. 4, 5 pp. ISSN:0194-5947, 4 pp.

"Staples the Office Superstore to Participate in Visa 'Rewards for your Home' Promotion; Savings will be offered to thousands of Visa and Staples customers," Business Wire, Mar. 25, 1996, 2 pp.

Website: American Express/Cards/What's New/Introducing . . . New Partners, more exciting rewards: The Membership Rewards program for 1998, (http // wwwamericanexpresscom/rewards/news/docs/1998new.sub.—mr shtml), download date: Mar. 12, 1998, 38 pp.

Campos, Frellie, "Discount shopping program extended to residents", Pacific Business News, Sep. 21, 1998, vol. 36, Issue 27, 3 pp.

Office Action for U.S. Appl. No. 09/166,405 mailed Sep. 13, 2000, 15 pp.

Office Action for U.S. Appl. No. 09/166,405 mailed Mar. 8, 2001, 14 pp.

Office Action for U.S. Appl. No. 09/166,405 mailed Jun. 29, 2001, 5 pp.

Notice of Allowability for U.S. Appl. No. 09/166,405 mailed Nov. 27, 2001, 4 pp.

Supplemental Notice of Allowability for U.S. Appl. No. 09/166,405 mailed Jan. 16, 2002, 5 pp.

Notice of Allowance for U.S. Appl. No. 10/118,620 mailed Dec. 16, 2005, 17 pp.

Office Action for U.S. Appl. No. 10/118,620 mailed Oct. 28, 2004, 15 pp.

Office Action for U.S. Appl. No. 10/118,620 mailed Apr. 13, 2004, 16 pp.

Notice of Allowance for U.S. Appl. No. 11/399,143 mailed Dec. 27, 2007, 7 pp.

Notice of Allowance for U.S. Appl. No. 11/399,143 mailed Jun. 27, 2007, 10 pp.

Office Action for U.S. Appl. No. 11/399,143 mailed Jan. 17, 2007, 10 pp.

International Search Report for Application No. PCT/US 99/22060 mailed Feb. 16, 2000, 4 pp.

Written Opinion for PCT/US 99/22060 mailed Jul. 9, 2000, 11 pp.

International Preliminary Examination Report for PCT/US 99/22060 mailed Jan. 11, 2001, 11 pp.

"New Wave Marketing", Promotion Times, An SCA Quarterly Newsletter—First Quarter, undated.

Cook, Louise, "ConsumerWatch: Clip, Snip, Save", The Associated Press, Mar. 12, 1984, Business News Section, 2 pp.

Lacher, Lisa, "Coupon Gimmick Registers Profits", Business Dateline, Business Record, Dec. 7, 1987, vol. 83, No. 47, Section 1 at p. 1.

Stevens, Lawrence, "Hypermarket Challenge", Computerworld, Dec. 19, 1988, Section: Software & Services, 2 pp.

"Safeway Introduces Store-Generated Coupons", PR Newswire, May 1, 1990, 1 pg.

(56) References Cited

OTHER PUBLICATIONS

Blattberg, Robert C. et al., "Interactive marketing: exploiting the age of addressability.", Information Access Company, a Thomson Corporation Company, Sloan Management Review, Sep. 22, 1991, vol. 33, No. 1, p. 5, 15 pp.

Ramirez, Anthony, "The Pizza Version of Dialing '911'", The New York Times, Sep. 9, 1991, Late Edition—Final, Section D, p. 1, col. 3, Financial Desk, 4 pp.

O'Kane, Gerry, "Parking your car by computer", South China Morning Post, Mar. 23, 1993, Section: Supplement at p. 3, 3 pp.

McDowell, Bill, "Frequency marketing builds repeat business; Management", Information Access Company, a Thomson Corporation Company, Reed Publishing USA, Building Supply Home Centers, Aug. 1993, No. 2, vol. 165, p. 96, 5 pp.

Rubel, Chad, "Young firm armed with technology fights an old giant; ETM to Ticketmaster: Let's rock", American Marketing Association, Marketing News TM, Jun. 19, 1995, 3 pp.

"Tecmark Reward Terminal", Tecmark Services, Inc., Copyright 1996, (http //www tecmarkinc com/terminal htm), 1 pg.

McKinney, Jeff, "Merchant program could pay off for Provident", The Cincinnati Enquirer, Mar. 24, 1996, Section: Financial, 2 pp.

Wagner, Jim, "Cameras Tell Mall What Door You Use, How Often You Go", Albuquerque Tribune, Aug. 9, 1996, 2 pp.

Fickenscher, Lisa, "Amex to Start Free Rewards Program with Discounts on Merchandise", The American Banker, Oct. 18, 1996, 2 pp.

Fitzgerald, Kate, "Amex Program Moves Loyalty to Next Level: Custom Extras Finds a Medium Customers Can't Ignore: Billing Statements", Crain Communications Inc., Advertising Age, Nov. 4, 1996, 2 pp.

"Click this box for extra pepperoni; CyberSlice routes online orders", The Dallas Morning News, Dec. 2, 1996, Section: Business at p. 6D, 2 pp.

Bonnici, Joseph et al., "Consumer issues in coupon usage: An exploratory analysis", Journal of Applied Business Research, Winter 1996/1997, vol. 13, No. 1, p. 31-40, 12 pp.

Fickenscher, Lisa, "Merchant: American Express Seeks to Mine Its Data on Cardholder Spending Patterns", The American Banker, Mar. 24, 1997, 2 pp.

"Dispensing the future", Lafferty Publications Limited, Electronic Payments International, May 1997, 5 pp.

"Grocery shopping goes on line in many markets; Technology spurs remote ordering concept", The Dallas Morning News, May 12, 1997, 2 pp.

"Industry Briefs", Phillips Business Information, Inc., Card News, Jun. 9, 1997, 2 pp.

Popyk, Bob, "Turn customers into torchbearers", Information Access Company, a Thomson Corporation Company, National Trade Publications, Boating Industry, Sep. 1997, 3 pp.

Hoeschen, Brad, "Brookfield Square hopes mall card strikes a chord", The Business Journal of Milwaukee Inc., Business Dateline, Business Journal-Milwaukee, Sep. 12, 1997, vol. 14, 2 pp.

"Acxiom Case-in-Point Case Study—Bloomingdale's Inc.", "Pushing Technology's Edge Upscale department store applies database for profit", (http //www acxiom com/cap-cuss-b him), download date: Sep. 23, 1997, 2 pp.

"NCR 7452 Workstation—Beyond Traditional POS", neither (http //www nor com/product/retail/products/catalog/7452 sham), download date: Sep. 23, 1997.3 pp.

"From Our Family to Yours . . . 5 Weeks of Coupon Values for a Valuable Customer", Shoprite, Wake fern Food Corporation, Copyright 1998, 1 pg.

Heller, Al, "Chain Pharmacy: Forecast '98: New Technology Advances Pharmacy Productivity", Lehar-Friedman Inc., Drug Store News, Jan. 12, 1998, 4 pp.

"Advanced Mechanics Internet Specials", (http //www metroplexweb com/advcpn2 htm), download date: Mar. 12, 1998, 2 pp.

Rubinstein, Ed, "Internet Continues to Fortify Takeout Sector for Operators", Lebhar-Friedman Inc., Nation's Restaurant News, Mar. 23, 1998, 5 pp.

Hemsley, Steve, "Research and destroy; Point-of-purchase research provides brand managers . . . ", Centaur Communications Ltd., Marketing Week, Apr. 16, 1998, 4 pp.

"WellsPark Group Lauches 'V.I.P. Rewards'; the Most Comprehensive Relationship Marketing Program Ever Created by a Mall Developer", Business Wire, Inc., May 19, 1998, 2 pp.

"Catching Red Light Runners", Business Communications Company, Advanced Transportation Technology News, Jun. 1998, 2 pp.

Amato-McCoy, Deena, "Co-Branded Acme Credit Card Rewards Loyal Users", Information Access Company, A Thomson Corporation Company, Capital Cities Media Inc., Supermarket News, Jun. 15, 1998, 2 pp.

"Acme Markets, U.S. Bancorp Debut visa Rewards Card", Phillips Business Information, Inc., Card News, Jun. 22, 1998, vol. 13, No. 12. 1 pg.

Rubinstein, Ed, "Technology: Prepaid program lets Galleria guests dine 'a la Card'", Nations's Restaurant News, (http //www nrn com), Jun. 29, 1998, 1 pg.

"DataCard Partners With CSI to Offer Card-Based Loyalty Solution to Merchants", Business Wire, Inc., Jul. 9, 1998, 1 pg.

Albright, Mark, "Grocery savings via Web coupons", Times Publishing Company, St. Petersburg Times, Jul. 22, 1998, 2 pp.

"Garage management needs", "Unit Tracking with the General Manager Professional", (http www dacobusy com/garage/idxgarg htm), download date: Mar. 16, 1999, 2 pp.

"Route Sales Automation—Track customers, orders, sales, and inventory! Route accounting,..", "Point of sale system carried in the palm of your hand", (http //www dacobusy com/), download date: Mar. 16, 1999, 1 pg.

"Alphatech, Inc., Looking to the Future", (http //www alphatech com/), download date: Mar. 25, 1999, 2 pp.

"Alphatech: Technologies and Projects", (http //www alphatech com/secondary/techpro/compvis html), download date: Mar. 25, 1999. 1 pg.

"IMPS: Vehicle License Plate Recognition System", "IMPS™ Integrated Multi-Pass System State of the Art Vehicle License Plate Recognition System", (http www singapore com/optasia/imps), download date: Mar. 25, 1999, 3 pp.

"MSTAR main", "Moving and Stationary Target Acquisition and Recognition (MSTAR)", (http www alphatech com/secondary/techpro/projects/mstar/MSTAR_TopLevel html), download date: Mar. 25, 1999, 2 pp.

"Welcome to Q Lube!", (http //www qlube com/), download date: Mar. 25, 1999, 1 pg.

* cited by examiner

600

| MERCHANT IDENTIFIER 620 | NAME 622 | ADDRESS 624 | SIC CODE 626 | BILLING INSTRUCTIONS 628 |
|---|---|---|---|---|
| M0001 | CORP. X | 123 MAIN ST. CITY, USA | 1111 | BILL TO MAILING ADDRESS |
| M0002 | STORE Y | 8910 RIVER PL. SUBURB, USA | 2222 | BILL TO 1 MAIN ST. NOWHERE, USA |
| M0003 | OUTLET Z | 248 STATE HWY. TOWN, USA | 3333 | NONE |

602 → M0001
604 → M0002
606 → M0003

| AMOUNT OWED 630 | PAYMENT DUE DATE 632 | BUDGET AMOUNT REMAINING 634 | FROZEN PORTION 636 | PRIORITY 638 |
|---|---|---|---|---|
| $807.00 | 11/10/99 | $893.00 | $112.00 | A |
| $350.00 | 11/22/99 | $50.00 | $18.00 | B |
| $0.00 | NONE | $1,000.00 | $0.00 | A |

| MERCHANT IDENTIFIER M0001   CORP. X | | | | 702 |
|---|---|---|---|---|
| SOLICITING MERCHANT IDENTIFIER 720 | WILL OUTPUT FOR THE SOLICITING MERCHANT 722 | FEE TO OUTPUT 724 | PRIORITY 726 | |
| M0002 | YES | $1.00 | 2 | |
| M0003 | YES | -- | 1 | |

704 → (row M0002)
706 → (row M0003)

FIG. 7

| CRITERIA IDENTIFIER 822 | OUTPUTTING MERCHANT IDENTIFIER 824 | REQUIRED PURCHASE PRICE AT OUTPUTTING MERCHANT 826 | TIME OF TRANSACTION AT OUTPUTTING MERCHANT 828 | BONUS IDENTIFIER 830 | SOLICITING MERCHANT 832 |
|---|---|---|---|---|---|
| C0001 | M0003 | > $20 | ANY | D0004 | M0001 |
| C0002 | M0003 | ANY | ANY | D0003 | M0003 |
| C0003 | M0001 | > $10 | WEEKDAYS BEFORE 5:00 PM | D0001 | M0002 |
| C0004 | M0002 | ANY | SATURDAY & SUNDAY | D0004 | M0001 |

FIG. 8

| RULE IDENTIFIER 920 | RULE IS ACTIVE WHEN 922 | PRIORITIZATION 924 |
|---|---|---|
| R001 | CURRENT TIME > 7:00 PM | MERCHANT CLASS = RESTAURANT: PRIORITY = 1<br>MERCHANT CLASS ≠ RESTAURANT: PRIORITY = 2 |
| R002 | ALWAYS | MERCHANT CLASS = MERCHANT CLASS OF OUTPUTTING MERCHANT: PRIORITY = 1<br>MERCHANT CLASS ≠ MERCHANT CLASS OF OUTPUTTING MERCHANT: PRIORITY = 2 |
| R003 | CURRENT TIME - MOVIE START TIME < 10 MINS. | MERCHANT CLASS = MOVIE THEATER: PRIORITY = 1<br>MERCHANT CLASS ≠ MOVIE THEATER: PRIORITY = 2 |
| R004 | CURRENT MONTH = JUNE, JULY OR AUGUST AND CURRENT TEMPERATURE > 80°F | MERCHANT CLASS = ICE CREAM SHOP: PRIORITY = 1<br>MERCHANT CLASS ≠ ICE CREAM SHOP: PRIORITY = 2 |

FIG. 9

| BONUS IDENTIFIER 1020 | BONUS VALUE 1022 | SOLICITING MERCHANT IDENTIFIER 1024 | TIME OF TRANSACTION AT SOLICITING MERCHANT 1026 | REQUIRED PURCHASE PRICE AT SOLICITING MERCHANT 1028 | REQUIRED ITEM(S) TO PURCHASE 1030 |
|---|---|---|---|---|---|
| D0001 | 10% OFF | M0002 | ANY | > $5.00 | NONE |
| D0002 | $15 OFF | M0003 | ANY | NONE | ITEM # 12345678 |
| D0003 | 1/2 OFF SECOND PURCHASE PRICE, UP TO $40 | M0003 | MONDAY - FRIDAY | NONE | NONE |
| D0004 | 5% OFF | M0001 | SATURDAY, 9:00 - 12:00 | > $10.00 | NONE |

| BONUS IDENTIFIER    D0001 | | | 1102 |
|---|---|---|---|
| BONUS VALUE    10% OFF | | | 1104 |
| MERCHANT IDENTIFIER 1120 | TIME OF TRANSACTION 1122 | REQUIRED PURCHASE PRICE 1124 | REQUIRED ITEM(S) TO PURCHASE 1126 |
| M0002 | ANY | ANY | ITEM # 12345678 |
| M0001 | SUNDAY MORNING | > $10.00 | NONE |
| M0003 | WEEKDAYS BEFORE 5:00 PM | ANY | NONE |

1100

1106 → (row M0002)
1108 → (row M0001)
1110 → (row M0003)

| OFFER IDENTIFIER 1220 | BONUS IDENTIFIER 1222 | CRITERIA IDENTIFIER 1224 | OUTPUTTING MERCHANT 1226 | SOLICITING MERCHANT 1228 | CUSTOMER IDENTIFIER 1230 | OFFER STATUS 1232 | VALIDITY PERIOD 1234 |
|---|---|---|---|---|---|---|---|
| 11001 | D0003 | C0001 | M0003 | M0003 | NONE | REDEEMED 3/21/99 | 3/1/99 - 3/29/99 |
| 11002 | D0001 | C0004 | M0002 | M0002 | 1111-1111-1111-1111 | UNREDEEMED | 3/20/99 - 4/20/99 |
| 11003 | D0004 | C0004 | M0002 | M0001 | 2222-2222-2222-2222 | EXPIRED 1/4/99 | 1/1/99 - 1/4/99 |

| BONUS IDENTIFIER 1320 | NUMBER OF OFFERS PROVIDED 1322 | NUMBERS OF OFFERS REDEEMED 1324 | NUMBER OF OFFERS UNREDEEMED 1326 | NUMBER OF OFFERS EXPIRED 1328 |
|---|---|---|---|---|
| D0001 | 24 | 12 | 3 | 9 |
| D0002 | 310 | 200 | 100 | 10 |
| D0003 | 82 | 10 | 20 | 52 |
| D0004 | 8 | 10 | 1 | 6 |

FIG. 13

| INVENTORY IDENTIFIER 1420 | DESCRIPTION 1422 | PRICE 1424 | QUANTITY REMAINING 1426 |
|---|---|---|---|
| 12345678 | MEN'S SHOES | $150.00 | 32 |
| 12345679 | TUBE SOCKS | $8.50 | 185 |

FIG. 14

| | | | |
|---|---|---|---|
| CUSTOMER IDENTIFIER    99123 | | | 1502 |
| DEAN GREEN | | | 1504 |
| ADDRESS    5500 MAIN ST    CITY, USA | | | 1506 |
| CREDIT CARD NUMBER    1111-2222-3333-4444 | | | 1508 |
| TRANSACTION IDENTIFIER 1520 | MERCHANT IDENTIFIER 1522 | DATE AND TIME 1524 | PURCHASE PRICE 1526 |
| 12345678901 | M0001 | 3/7/99 10:06 AM | $72.83 |
| 12345678909 | M0002 | 3/12/99 1:14 PM | $8.49 |

FIG. 15

METHOD AND APPARATUS FOR DEFINING ROUTING OF CUSTOMERS BETWEEN MERCHANTS

CROSS-REFERENCE TO RELATED APPLICATIONS

The present application is a continuation application of U.S. patent application Ser. No. 11/399,143 filed on Apr. 6, 2006 in the name of Walker et al. and entitled METHOD AND APPARATUS FOR DEFINING ROUTING OF CUSTOMERS BETWEEN MERCHANTS, which issued as U.S. Pat. No. 7,496,523 on Feb. 24, 2009; which application is a continuation application of U.S. patent application Ser. No. 10/118,620, filed Apr. 5, 2002 in the name of Walker et al. and entitled METHODS AND APPARATUS FOR DEFINING ROUTING OF CUSTOMERS BETWEEN MERCHANTS, which issued as U.S. Pat. No. 7,099,832 on Aug. 29, 2006; which application is a continuation application of U.S. patent application Ser. No. 09/166,405 entitled METHOD AND APPARATUS FOR DEFINING ROUTING OF CUSTOMERS BETWEEN MERCHANTS, filed Oct. 5, 1998 in the name of Walker et al. and issued as U.S. Pat. No. 6,405,174 B1 on Jun. 11, 2002. The entirety of each of the above-referenced applications is incorporated by reference herein for all purposes.

FIELD OF THE INVENTION

The present invention relates to methods and apparatus for providing discounts.

BACKGROUND OF THE INVENTION

Merchants rarely experience consistent levels of sales. It is more typical that a merchant will experience periods of low sales activity interspersed with brief periods of high sales activity. Inconsistent sales activity, such as during cyclic or seasonal periods, makes it difficult for merchants to make inventory and pricing decisions. Merchants would like to entice customers to visit the business, particularly during periods of low sales activity. Merchants would particularly like to entice each customer to participate in transactions, such as purchases or simply visiting the store, more frequently.

It is difficult for a merchant to respond quickly to changing conditions. For example, if sales activity is low in the morning, the merchant cannot successfully advertise in time to attract customers that same morning. Since the merchant typically cannot know precisely when it will need customers (i.e. "slow days") and when customers will be in abundance, attracting customers at optimal times if difficult or impossible.

It would be advantageous to provide a method and apparatus that allowed a business to more effectively attract customers at desirable times.

SUMMARY OF THE INVENTION

Provided are methods and apparatus for more effectively attracting customers at desirable times.

In accordance with the present invention, a server or Internet service provider computer selects a soliciting merchant and an outputting merchant based on various factors. In one embodiment, the soliciting merchant is selected is its activity rate (e.g. sales rate) is low. The outputting merchant provides offers for bonuses to customers on behalf of the soliciting merchant. The bonus is provided to the customer in exchange for consummating a transaction with the soliciting merchant. Thus, the soliciting merchant benefits from the increased patronage such offers encourage.

BRIEF DESCRIPTION OF THE DRAWINGS

FIG. 6 is a schematic illustration of an embodiment of a merchant database of the Internet service provider of FIG. 3.

FIG. 7 is a schematic illustration of a record of another embodiment of a merchant database of the Internet service provider of FIG. 3.

FIG. 8 is a schematic illustration of an embodiment of an offer criteria database of the Internet service provider of FIG. 3.

FIG. 9 is a schematic illustration of an embodiment of a priority database of the Internet service provider of FIG. 3.

FIG. 10 is a schematic illustration of a record of an embodiment of a bonus database of the Internet service provider of FIG. 3.

FIG. 11 is a schematic illustration of a record of an embodiment of a bonus database of the Internet service provider of FIG. 3.

FIG. 12 is a schematic illustration of an embodiment of an offer database of the Internet service provider of FIG. 3.

FIG. 13 is a schematic illustration of an embodiment of an offer summary database of the Internet service provider of FIG. 3.

FIG. 14 is a schematic illustration of an embodiment of an inventory database of the POS terminal of FIG. 3.

FIG. 15 is a schematic illustration of a record of an embodiment of a customer database of the POS terminal of FIG. 3.

DETAILED DESCRIPTION OF THE PREFERRED EMBODIMENTS

In accordance with the present invention, a soliciting merchant may direct ("route") customers from other merchants to participate in transactions (e.g. purchases) with the soliciting merchant. In one embodiment, during periods of low activity the soliciting merchant may direct customers from other merchants by directing the merchants, known as "outputting merchants", to provide offers for bonuses to the customers on behalf of the soliciting merchant. The bonus is generally a discount such as a reduced purchase price or credit to a credit card account.

The offer may define conditions that the customer must meet in order to receive the bonus. The customer may meet the conditions while participating in a second transaction with the soliciting merchant. For example, the customer may be required to spend at least a minimum purchase price at the second merchant on a particular day. Once the conditions are satisfied, the bonus is awarded to the customer. In one embodiment, the bonus is applied by crediting a credit card account used during the first and/or second transaction.

The present invention is particularly advantageous in that it allows various merchants to participate in mutually beneficial "co-branding" opportunities. The present invention may be employed in an embodiment where the customer conducts transactions remotely via a personal computer or similar device for communicating remotely with a store controller. For example, a customer may use his computer to access the World Wide Web sites of merchants, indicate purchases, and pay by transmitting a credit card number to the merchants.

Figure 1:
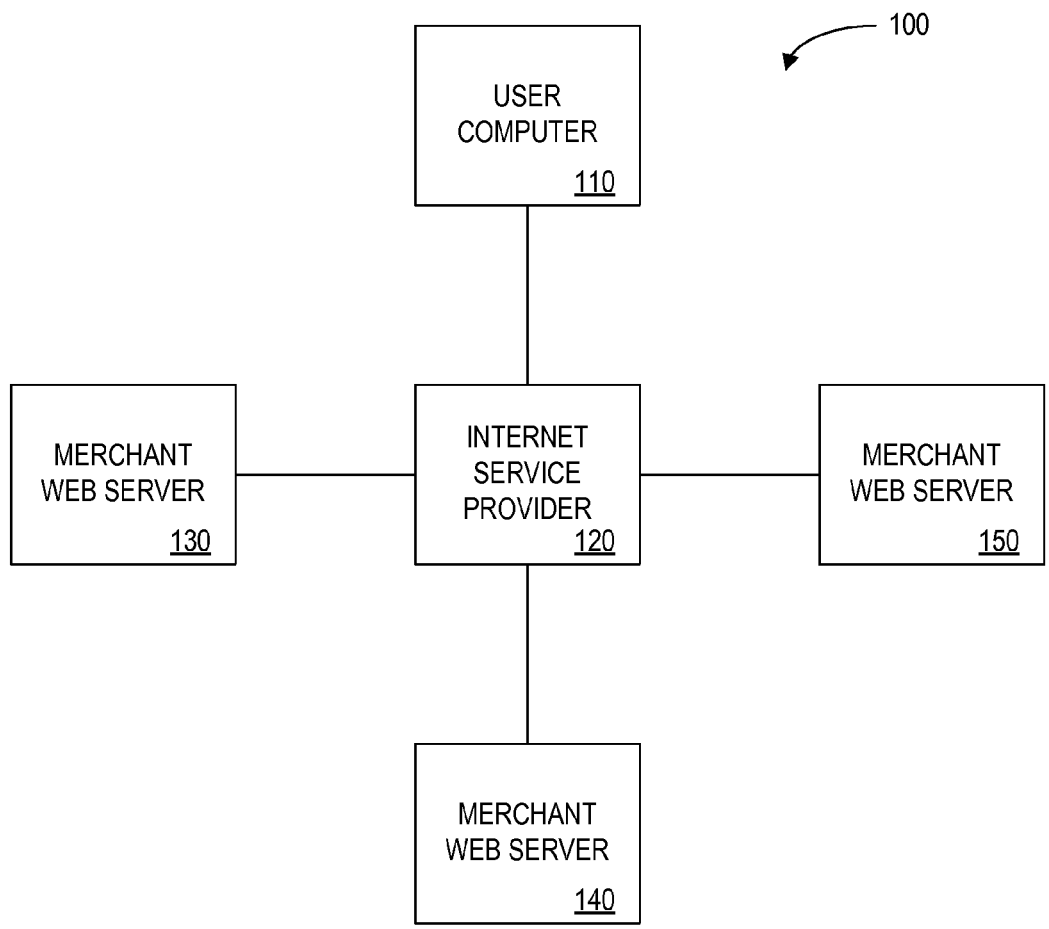
FIG. 1 is a schematic illustration of an apparatus provided in accordance with the present invention.

Referring to FIG. 1, an apparatus 100 includes a user computer 110 that is in communication with an Internet service provider computer 120. The user computer 110 is typically a personal computer operated by the customer and equipped to access the Internet or other electronic network. The Internet service provider computer 120 is a computer that enables the user computer 110 to access the Internet in a manner known in the art. Accordingly, the Internet service provider computer 120 may be of the type controlled and/or operated by America Online, Prodigy, or Microsoft for offering Internet connectivity and content to users.

The Internet service provider computer 120 is in turn in communication through the Internet with a merchant web servers 130, 140 and 150 in a manner known in the art. As is also known in the art, the merchant web servers 130, 140 and 150 may control "web sites" that may be accessed by the user computer 110 upon entering appropriate commands. Although three merchant web servers are shown in FIG. 1, any number of merchant web servers may be in communication with the Internet service provider computer 120 without departing from the spirit and scope of the present invention.

The Internet service provider computer 120 may perform many of the processes described below as performed by a merchant web server, especially those processes that are performed for more than one merchant web server. The Internet service provider computer 120 may also store data that is used by more than one merchant web server.

The present invention may also be advantageously employed in an embodiment where the customer conducts transactions at physical stores, such as stores in a mall. Similarly, the customer may conduct transactions by communicating via a telephone with catalog merchants, such as Land's End.

Figure 2:
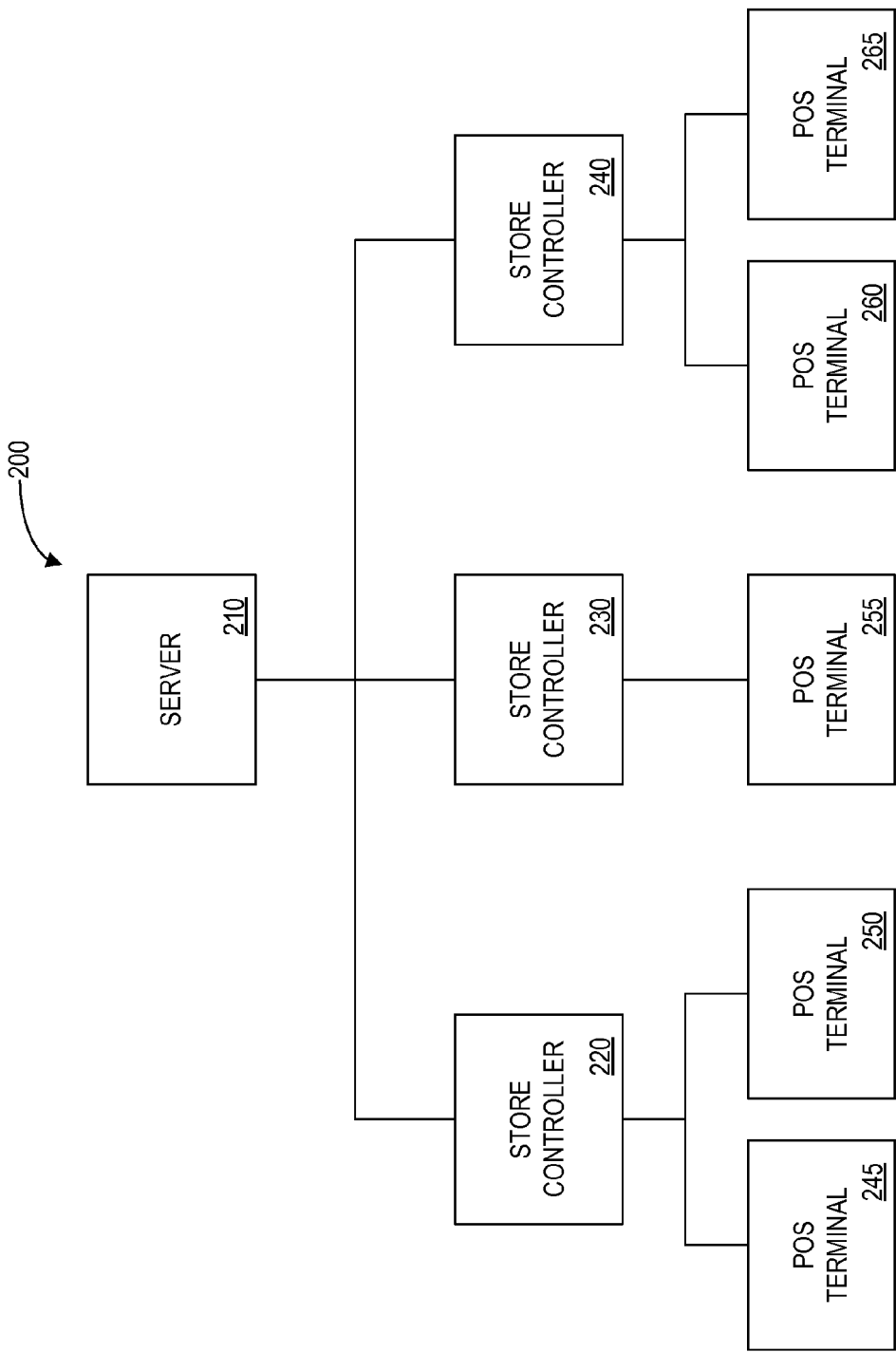
FIG. 2 is a schematic illustration of another embodiment of an apparatus provided in accordance with the present invention.

Referring to FIG. 2, an apparatus 200 includes a server 210 that is in communication with store controllers 220, 230 and 240 by means of a network such as Microsoft First Datacorp ("MSFDC"). The server 210 directs the operation of, stores data from, and transmits data to the store controllers 220, 230 and 240. The server 210 is a computing device that can communicate with one or more store controllers. The server 210 may be a computer that is owned and/or operated by a credit card clearinghouse such as First Data Corporation.

Although three store controllers are shown in FIG. 2, any number of store controllers may be in communication with the server 210 without departing from the spirit and scope of the present invention. The store controllers 220, 230 and 240 are typically located in different stores, such as in different stores of a mall. Similarly, the store controllers 220, 230 and 240 may each control different catalog merchants. The store controllers may also be computers that direct an "online store", such as a web server that receives and processes orders for goods. In such an embodiment, each store controller would be equivalent to a merchant web server depicted in FIG. 1. Similarly, in such an embodiment the server 210 would be equivalent to the Internet service provider 120 depicted in FIG. 1.

The server 210 may perform many of the processes described below as performed by a store controller, especially those processes that are performed for more than one store controller. The server 210 may also store data that is used by more than one store controller.

Each store controller is in communication with one or more POS terminals. Specifically, the store controller 220 is in communication with POS terminals 245 and 250, the store controller 230 is in communication with a POS terminal 255 and the store controller 240 is in communication with POS terminals 260 and 265. The POS terminals may be, for example, the NCR 7454 manufactured by NCR Corporation or the IBM 4683 manufactured by International Business Machines. Each store controller directs the operation of, stores data from, and transmits data to the POS terminal(s) with which it is in communication. For example, as described below, each store controller may store a database of inventory to indicate to the POS terminals the prices of items purchased.

Figure 3:
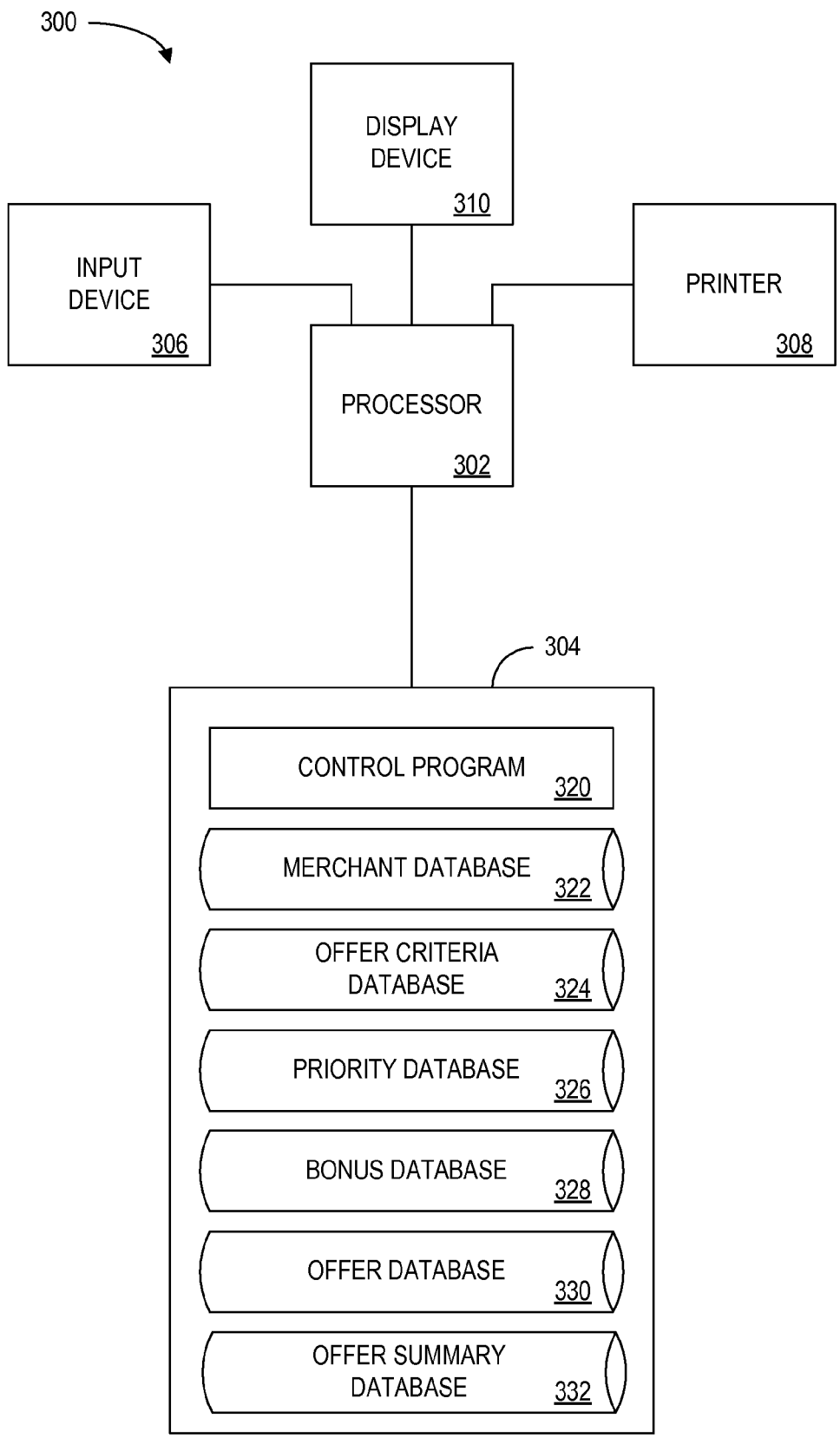
FIG. 3 is a schematic illustration of an Internet service provider of the apparatus of FIG. 1.

Referring to FIG. 3, reference numeral 300 indicates a more detailed illustration of the server 210 (FIG. 2) or, in another embodiment, of the Internet service provider 120 (FIG. 1). A processor 302 that comprises one or more conventional microprocessors such as the Intel® Pentium® microprocessor is in communication with a data storage device 304, such as an appropriate combination of magnetic, optical and/or semiconductor memory. The processor 302 and the storage device 304 may each be (i) located entirely within a single computer or other computing device; (ii) connected to each other by a remote communication medium, such as a serial port cable, telephone line or radio frequency transceiver; or (iii) a combination thereof. For example, reference numeral 300 may represent one or more computers that are connected to a remote computer for maintaining databases.

The processor 302 is also in communication with an input device 306, a printer 308 and a display device 310. The input device 306 may comprise a keypad for transmitting input signals to the processor 302. Other types of input devices are known to those skilled in the art. The printer 308 is for registering indicia on paper or other material. The display device 310 is operative to display at least alphanumeric characters, and thus may be any of a number of known video monitors, liquid crystal displays ("LCD") or light emitting diode ("LED") displays. Many types of input devices and display devices are known to those skilled in the art, and need not be described in detail herein.

The storage device 304 stores a control program 320 for controlling the processor 302. The processor 302 performs instructions of the control program 320 and thereby operates in accordance with the present invention and particularly in accordance with the methods described in detail herein. The control program 320 furthermore includes program elements that may be necessary, such as an operating system and "device drivers" for allowing the processor 302 to interface with computer peripheral devices, such as the input device 306, the printer 308 and the display device 310. Appropriate device drivers and other necessary program elements are known to those skilled in the art and need not be described in detail herein.

The storage device 304 also stores (i) a merchant database 322, (ii) an offer criteria database 324, (iii) a priority database 326, (iv) a bonus database 328, (v) an offer database 330, and (vi) an offer summary database 332. In addition, other devices (e.g. the store controllers of FIG. 2 or the merchant web servers of FIG. 1) may obtain information from the databases stored by the storage device 304. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

In various embodiments, any or all of the above-described databases could be stored (i) on the computer of an Internet service provider ("ISP"), (ii) on another computer on the Internet, or (iii) locally on the consumer's computer (e.g. in the browser software or in a "cookie" or other file). In other embodiments, any or all of the above-described databases could be stored by POS terminals.

Figure 4:
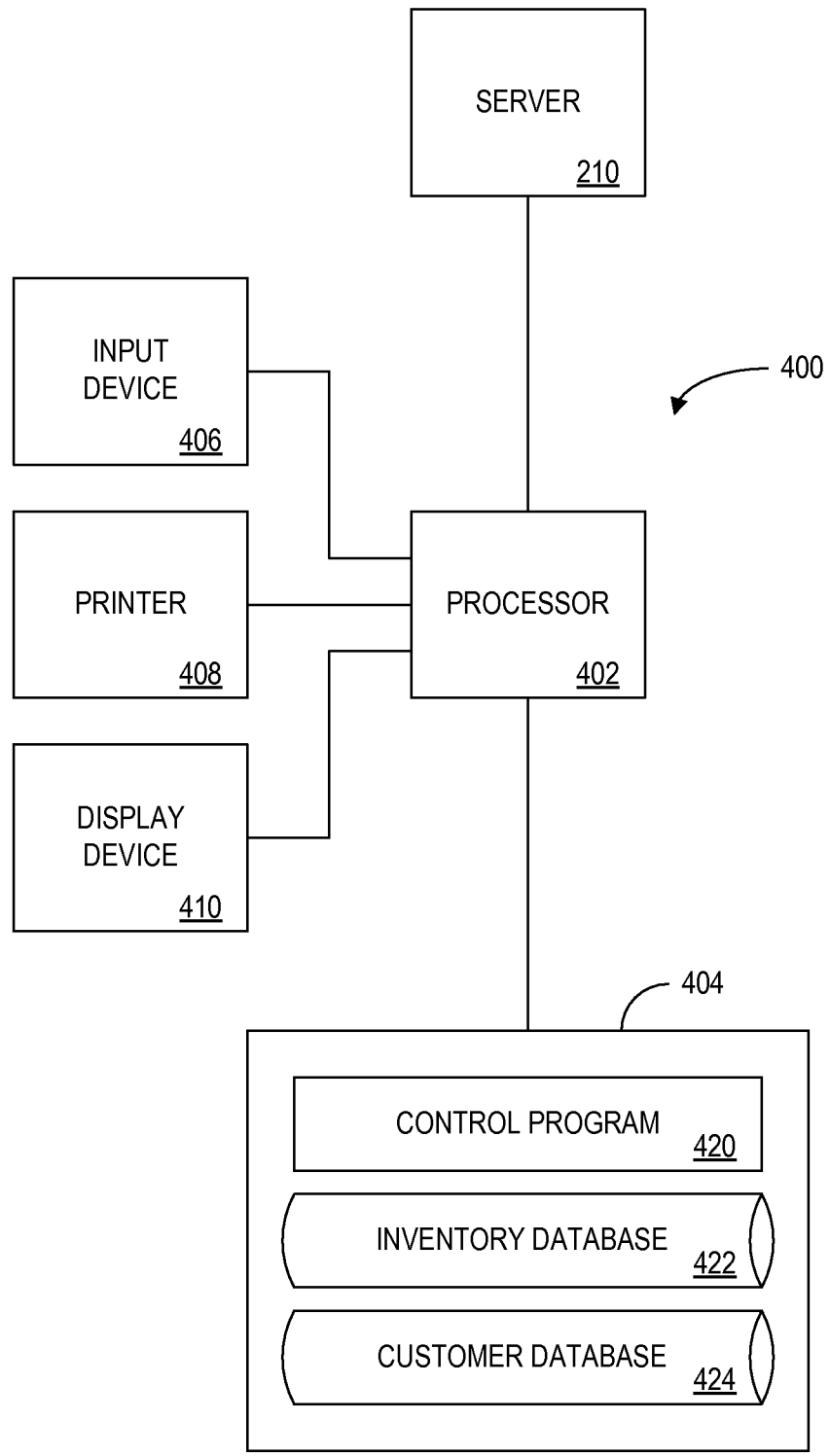
FIG. 4 is a schematic illustration of a merchant web server of the apparatus of FIG. 1.

Referring to FIG. 4, a store controller 400 is descriptive of any or all of (i) the store controllers 220, 230 and 240 (FIG. 2), as well as (ii) the merchant web servers 130, 140 and 150. The store controller 400 includes a processor 402 that comprises one or more conventional microprocessors such as the Intel® Pentium® microprocessor. The processor 402 is in communication with a data storage device 404, such as an appropriate combination of magnetic, optical and/or semiconductor memory. The processor 402 and the storage device 404 may each be (i) located entirely within a single computer or other computing device; (ii) connected to each other by a remote communication medium, such as a serial port cable, telephone line or radio frequency transceiver; or (iii) a combination thereof. For example, the store controller 400 may comprise one or more computers that are connected to a remote computer for maintaining databases.

The processor 402 is also in communication with an input device 406, a printer 408 and a display device 410. The input device 406 preferably comprises a keypad for transmitting input signals to the processor 402. The printer 408 is for registering indicia on paper or other material. The display device 410 is operative to display at least alphanumeric characters to the customer and/or cashier, and thus may be any of a number of known video monitors, liquid crystal displays ("LCD") or light emitting diode ("LED") displays. Many types of input devices, printers and display devices are known to those skilled in the art, and need not be described in detail herein.

The storage device 404 stores a control program 420 for controlling the processor 402. The processor 402 performs instructions of the control program 420 and thereby operates in accordance with the present invention and particularly in accordance with the methods described in detail herein. The control program 420 furthermore includes program elements that may be necessary, such as an operating system and "device drivers" for allowing the processor 402 to interface with computer peripheral devices. Appropriate device drivers and other necessary program elements are known to those skilled in the art and need not be described in detail herein.

The storage device 404 also stores (i) an inventory database 422, and (ii) a customer database 424. In another embodiment, one or more POS terminals or merchant web servers may store one or more of the databases 422 and 424. The databases 422 and 424 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 5:
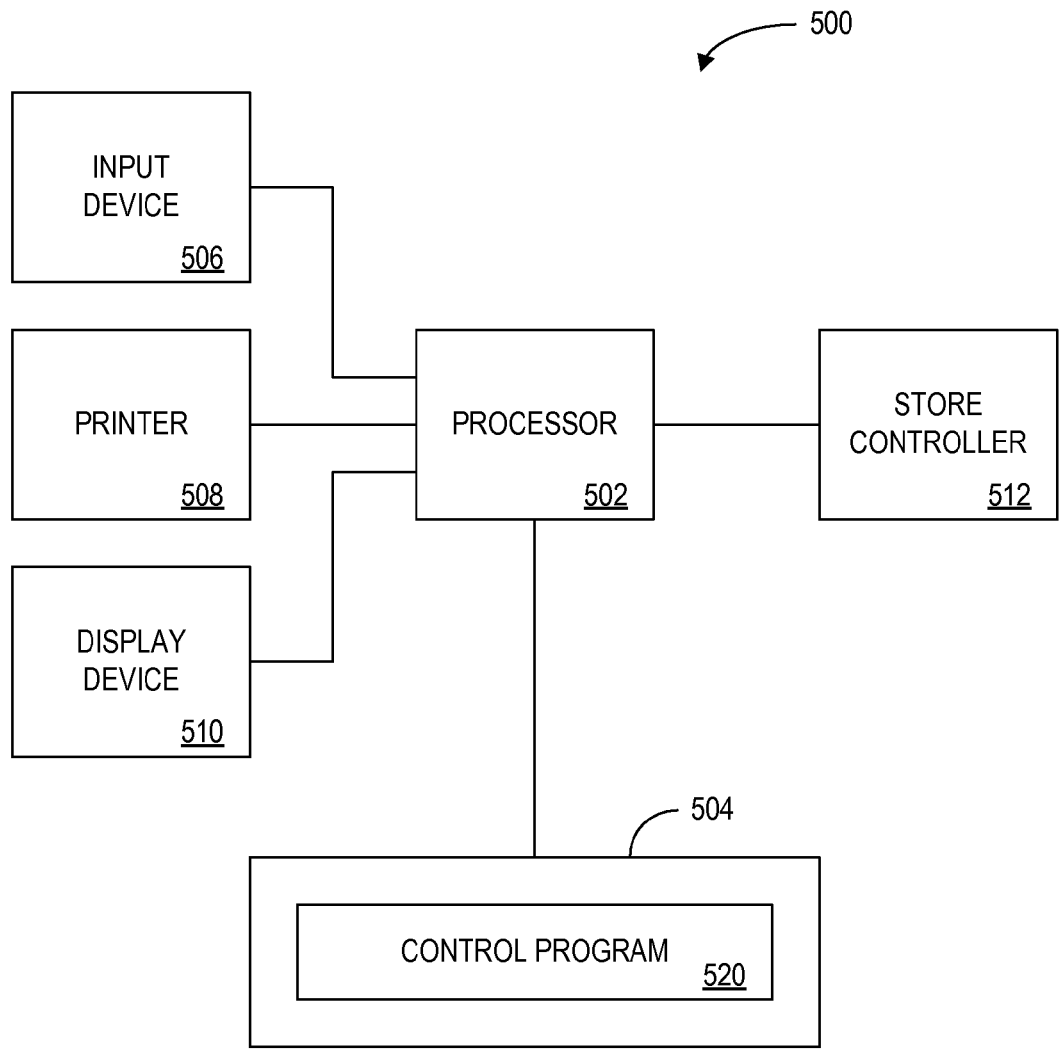
FIG. 5 is a schematic illustration of a POS terminal of the apparatus of FIG. 1.

Referring to FIG. 5, a POS terminal 500 is descriptive of any or all of the POS terminals 220, 230 and 240 (FIG. 2). The POS terminal 500 includes a processor 502 that comprises one or more conventional microprocessors such as the Intel® Pentium® microprocessor. The processor 502 is in communication with a data storage device 504, such as an appropriate combination of magnetic, optical and/or semiconductor memory. The processor 502 and the storage device 504 may each be (i) located entirely within a single computer or other computing device; (ii) connected to each other by a remote communication medium, such as a serial port cable, telephone line or radio frequency transceiver; or (iii) a combination thereof. For example, the POS terminal 500 may comprise one or more computers that are connected to a remote computer for maintaining databases.

The processor 502 is also in communication with an input device 506, a printer 508 and a display device 510. The input device 506 may comprise one or more of (i) a keypad for transmitting input signals to the processor 502; (ii) a card reader for reading magnetically-encoded information on cards passed therethrough, such as credit cards, frequent shopper cards and identity cards; (iii) an optical scanner for reading bar codes, such as bar codes registered on items of inventory; (iv) a touch screen for generating signals that indicate when and where the screen has been touched, pressed or actuated; and (v) a card reader for reading from and writing to a chip-based "smart card" such as those manufactured by Mondex. The printer 508 is for registering indicia on paper or other material, thereby printing receipts, coupons and vouchers as commanded by the processor 502. The display device 510 is operative to display at least alphanumeric characters to the customer and/or cashier, and thus may be any of a number of known video monitors, liquid crystal displays ("LCD") or light emitting diode ("LED") displays. Many types of input devices, printers and display devices are known to those skilled in the art, and need not be described in detail herein.

The storage device 504 stores a control program 520 for controlling the processor 502. The processor 502 performs instructions of the control program 520 and thereby operates in accordance with the present invention and particularly in accordance with the methods described in detail herein. The control program 520 furthermore includes program elements that may be necessary, such as an operating system and "device drivers" for allowing the processor 502 to interface with computer peripheral devices. Appropriate device drivers and other necessary program elements are known to those skilled in the art and need not be described in detail herein.

Referring to FIG. 6, a table 600 illustrates an embodiment of the merchant database 322 (FIG. 3). The table 600 includes entries 602, 604 and 606, each of which describes a merchant that owns, operates or controls a store controller or a merchant web server. It will be understood by those skilled in the art that the table 600 may include any number of entries. The table 600 also defines fields for each of the entries 602, 604 and 606, which specify (i) a merchant identifier 620 for uniquely identifying the merchant, (ii) a name 622 of the merchant, (iii) an address 624 of the merchant, (iv) a standard industry classification ("SIC") code 626 of the merchant which defines a merchant class of the merchant, (v) billing instructions 628 indicating how the merchant will be billed, (vi) an amount owed 630 by the merchant, (vii) a payment due date 632 on which the merchant must remit payment, (viii) a budget amount remaining 634 for the merchant, (ix) a frozen portion 636 of the budget amount, and (x) a priority 638 to be given to the merchant.

Referring to FIG. 7, a table 700 illustrates a record of the merchant database 322 (FIG. 3) in another embodiment of the present invention. In such an embodiment, the merchant database 322 includes a plurality of records, each of which describes a merchant that owns, operates or controls a store controller or a merchant web server. The table 700 includes the merchant identifier and merchant name 702. The table 700 also includes entries 704 and 706, each of which describes another merchant (a "soliciting merchant") and the relation between the soliciting merchant and the merchant described by the record. It will be understood by those skilled in the art that the table 700 may include any number of entries. The table 700 also defines fields for each of the entries 704 and 706, which specify (i) a soliciting merchant identifier 720, (ii) whether the merchant described by the record will output for the soliciting merchant 722, (iii) a fee 724 that the merchant described by the record will require in return for outputting an offer for the soliciting merchant, and (iv) a priority 726 that the soliciting merchant has. The priority may be used to select a soliciting merchant for which to output an offer if it is possible to output for more than one soliciting merchant.

Referring to FIG. 8, a table 800 illustrates an embodiment of the offer criteria database 324 (FIG. 3). The table 800 includes entries 802, 804, 806 and 808, each of which describes criteria for defining when to provide an offer for a bonus. The offer is provided to a customer if the customer satisfies criteria while participating in a first transaction with a first merchant. The first merchant, known as an "outputting merchant", outputs the offer for a bonus once the customer satisfies the criteria. It will be understood by those skilled in the art that the table 800 may include any number of entries. The table 800 also defines fields for each of the entries 802, 804, 806 and 808, which specify (i) a criteria identifier 822 for uniquely identifying the criteria, (ii) a merchant identifier 824 that identifies the outputting merchant, (iii) a required purchase price 826 that must be met in order to receive an offer for the bonus, (iv) a time of the transaction 828 that must be met in order to receive an offer for the bonus, (v) a bonus identifier 830 that uniquely identifies the bonus, and (vi) the soliciting merchant 832 on whose behalf the outputting merchant provides the offer. The required purchase price 826 and time of transaction 828 represent criteria that are based on transaction data. Those skilled in the art will understand that many other types of criteria may be used, such as the age of the customer or the type of credit card identifier used by the customer during the transaction.

The customer is required to participate in a transaction with the outputting merchant in order to receive the offer for the bonus. The customer may also be required to participate in the transaction at an indicated time, and the transaction may be required to have an indicated purchase price and include an indicated item. For example, the entry 806 (FIG. 8) indicates a bonus identified by "D0001". A customer receives an offer for the bonus "D0001" after having participated in a transaction for more than $10.00 with merchant "M0001" on a weekday before 5:00 PM. Further criteria may be specified as will be understood by those skilled in the art.

Referring to FIG. 9, a table 900 illustrates an embodiment of the priority database 326 (FIG. 3). The table 900 includes entries 902, 904, 906 and 908, each of which describes a rule for determining priority between two or more soliciting merchants. When an outputting merchant may provide offers on behalf of two or more soliciting merchants, the soliciting merchant with the highest priority is selected. It will be understood by those skilled in the art that the table 900 may include any number of entries. The table 900 also defines fields for each of the entries 902, 904, 906 and 908, which specify (i) a rule identifier 920 that uniquely identifies the rule, (ii) an indication 922 of when the rule is active and to be applied, and (iii) a prioritization 924 indicating which soliciting merchant(s) are to be afforded priority over others. For example, the entry 902 defines a rule that is applied only after 7:00 PM. The rule further defines that restaurants ("merchant class=restaurant") have higher priority ("Priority=1") over non-restaurants ("Priority=2"). Accordingly, after 7:00 an outputting merchant will output offers on behalf of a restaurant over offers on behalf of non-restaurants.

Referring to FIG. 10, a table 1000 illustrates an embodiment of the bonus database 328 (FIG. 3). The table 1000 includes entries 1002, 1004, 1006 and 1008, each of which describes a bonus that may be offered to a customer of an outputting merchant and conditions which the customer must meet with a soliciting merchant in order to receive the bonus. The bonus is typically awarded once the customer participates in a transaction with a second (soliciting) merchant, subject to the customer meeting the conditions. It will be understood by those skilled in the art that the table 1000 may include any number of entries. The table 1000 also defines fields for each of the entries 1002, 1004, 1006 and 1008, which specify (i) a bonus identifier 1020 for uniquely identifying the bonus, (ii) a bonus value 1022, (iii) a merchant identifier 1024 that identifies the second (soliciting) merchant, (iv) a time of the transaction 1026 with the soliciting merchant, (v) a required purchase price 1028 with the soliciting merchant, and (vi) a required item to purchase 1030, if any. The time of the second transaction, required purchase price at the soliciting merchant, and required item to purchase each represent a condition which the customer must meet in order to receive the bonus. Many other conditions may be used as well.

The bonus value is typically expressed as, for example, a percentage off the previous (first) transaction during which the offer for the bonus was made. The bonus value may also be expressed as a percentage off the current transaction. The customer is required to participate in a transaction with the soliciting merchant in order to receive the bonus. The customer may also be required to participate in a transaction at an indicated time, having an indicated purchase price and including an indicated item. For example, the entry 1008 indicates a bonus of five percent off the previous transaction. A customer receives this bonus after having participated in a transaction for more than $10.00 with merchant "M0001" on Saturday between 9:00 and 12:00.

Referring to FIG. 11, a table 1100 illustrates a record of the bonus database 328 (FIG. 3) in another embodiment of the present invention. In such an embodiment, the customer is provided with the bonus once the customer participates in a transaction with each of a plurality of soliciting merchants, subject to the customer meeting the conditions of each soliciting merchant. In one embodiment, the customer may be required to participate in the transactions in a predefined order. In another embodiment, no order of the transactions is required.

The table 1100 includes a bonus identifier 1102 and a bonus value 1104. The table 1100 also includes entries 1106, 1108 and 1110, each of which describes a soliciting merchant and conditions which the customer must meet at the soliciting merchant in order to receive the bonus. It will be understood by those skilled in the art that the table 1100 may include any number of entries. The table 1100 also defines fields for each of the entries 1106, 1108 and 1110, which specify (i) a merchant identifier 1120 for uniquely identifying the soliciting merchant, (ii) a time of the transaction 1122 with the soliciting merchant, (iii) a required purchase price 1124 with the soliciting merchant, and (iv) a required item to purchase 1126, if any. The time of the second transaction, required purchase price at the soliciting merchant, and required item to purchase each represent a condition which the customer must meet in order to receive the bonus. Many other conditions may be used as well.

Referring to FIG. 12, a table 1200 illustrates an embodiment of the offer database 330 (FIG. 3). The table 1200 includes entries 1202, 1204 and 1206, each of which describes an offer for a bonus that has been provided to a customer. It will be understood by those skilled in the art that the table 1200 may include any number of entries. The table 1200 also defines fields for each of the entries 1202, 1204 and 1206, which specify (i) an offer identifier 1220 for uniquely identifying the offer; (ii) a bonus identifier 1222 that uniquely identifies the bonus that has been offered; (iii) a criteria identifier 1224 that uniquely identifies the criteria that the customer satisfied in order to be offered the bonus; (iv) an outputting merchant 1226 that offered the bonus; (v) a soliciting merchant 1228 providing the bonus; (vi) a customer identifier 1230 that uniquely identifies the customer; (vii) an offer status 1232 which may indicate, for example, whether (and when) the offer is redeemed, unredeemed or expired; and (viii) a validity period 1234 that indicates when the offer is able to be redeemed. An offer for a bonus is considered redeemed when the bonus is provided to the customer.

Referring to FIG. 13, a table 1300 illustrates an embodiment of the offer summary database 332 (FIG. 3). The table 1300 includes entries 1302, 1304, 1306 and 1308, each of which describes summary information about bonuses that have been offered to customers. It will be understood by those skilled in the art that the table 1300 may include any number of entries. The table 1300 also defines fields for each of the entries 1302, 1304, 1306 and 1308, which specify (i) an bonus identifier 1320 for uniquely identifying the bonus, (ii) a number of offers for the bonus that were provided 1322, (iii) a number of offers for the bonus that were redeemed 1324, (iv) a number of offers for the bonus that were unredeemed 1326 (neither redeemed nor expired), and (v) a number of offers for the bonus that were expired 1328 (not redeemed before the end of the validity period of the offer). The number of offers for the bonus that were provided is the sum of the number of offers for the bonus that were redeemed, the number of offers for the bonus that were unredeemed and the number of offers for the bonus that were expired. Those skilled in the art will understand that the summary information may also be organized by offer or by offer and bonus jointly, rather than by bonus as illustrated in FIG. 13. The information in the offer summary database 332 may be updated periodically (e.g. once per day) to reflect offers that have expired or been redeemed.

Referring to FIG. 14, a table 1400 illustrates an embodiment of the inventory database 422 (FIG. 4). The table 1400 includes entries 1402 and 1404, each of which describes an item of inventory that is sold by a merchant. It will be understood by those skilled in the art that the table 1400 may include any number of entries. The table 1400 also defines fields for each of the entries 1402 and 1404, which specify (i) an inventory identifier 1420 for uniquely identifying the item of inventory, (ii) a description 1422 of the item of inventory, (iii) a price 1424 for which the item of inventory is sold, and (iv) a quantity remaining 1426 of the item of inventory.

Referring to FIG. 15, a table 1500 illustrates a record of the customer database 424 (FIG. 4). The customer database 424 typically includes a plurality of such records, each representing a customer and associated customer information. The customer information is typically recorded by the customer database 424 upon becoming registered for a "frequent shopper program" of the merchant. In other embodiments, the information about the customer may be acquired in another manner. The table 1500 includes a customer identifier 1502 that uniquely identifies the customer, a customer name 1504, and address 1506 of the customer and a credit card number 1508, if any, of the customer. In one embodiment, the customer identifier may be the credit card number. Accordingly, a customer using a credit card could be identified even if he had not registered for a frequent shopper program.

The table 1500 also includes entries 1510 and 1512, each of which describes a transaction of the customer. It will be understood by those skilled in the art that the table 1500 may include any number of entries. The table 1500 also defines fields for each of the entries 1510 and 1512, which specify (i) a transaction identifier 1520 that uniquely identifies the transaction, (ii) a merchant identifier 1522 that identifies the merchant with which the customer interacted during the transaction, (iii) a date and time 1524 of the transaction, and (iv) a purchase price 1526 of the transaction.

Figure 16A:
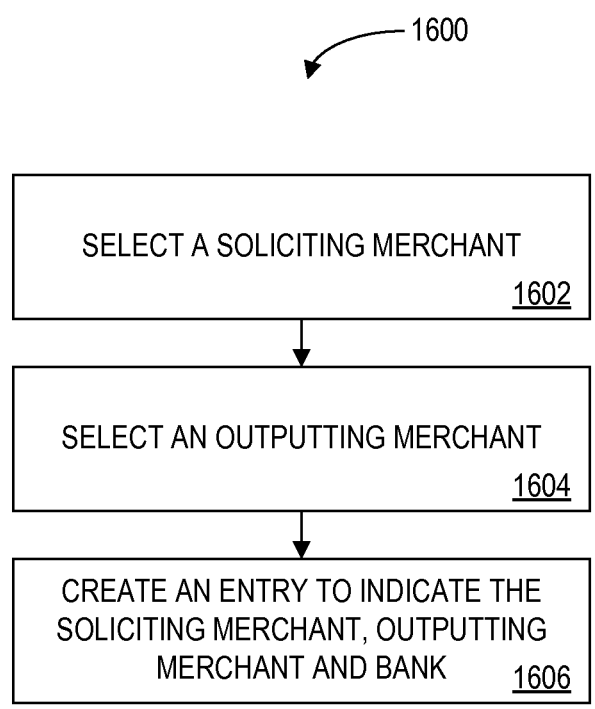
FIGS. 16A and 16B are a flow chart illustrating an embodiment of a method provided in accordance with the present invention.

Referring to FIG. 16A, a flow chart 1600 illustrates an embodiment of a method for providing an offer for a bonus. In particular, the illustrated method is performed to establish a "routing" of customers from outputting merchants to soliciting merchants. A soliciting merchant is selected (step 1602) from a plurality of possible soliciting merchants. Similarly, an outputting merchant is selected (step 1604) from a plurality of possible outputting merchants. As described in detail below, there are many ways in which the soliciting merchant and outputting merchant may be selected. After a soliciting merchant and an outputting merchant have been selected, an entry is created (step 1606) to indicate the soliciting merchant, outputting merchant and a bonus. As described above, the bonus is typically set by the soliciting merchant, and offered to a customer of the outputting merchant.

Figure 16B:
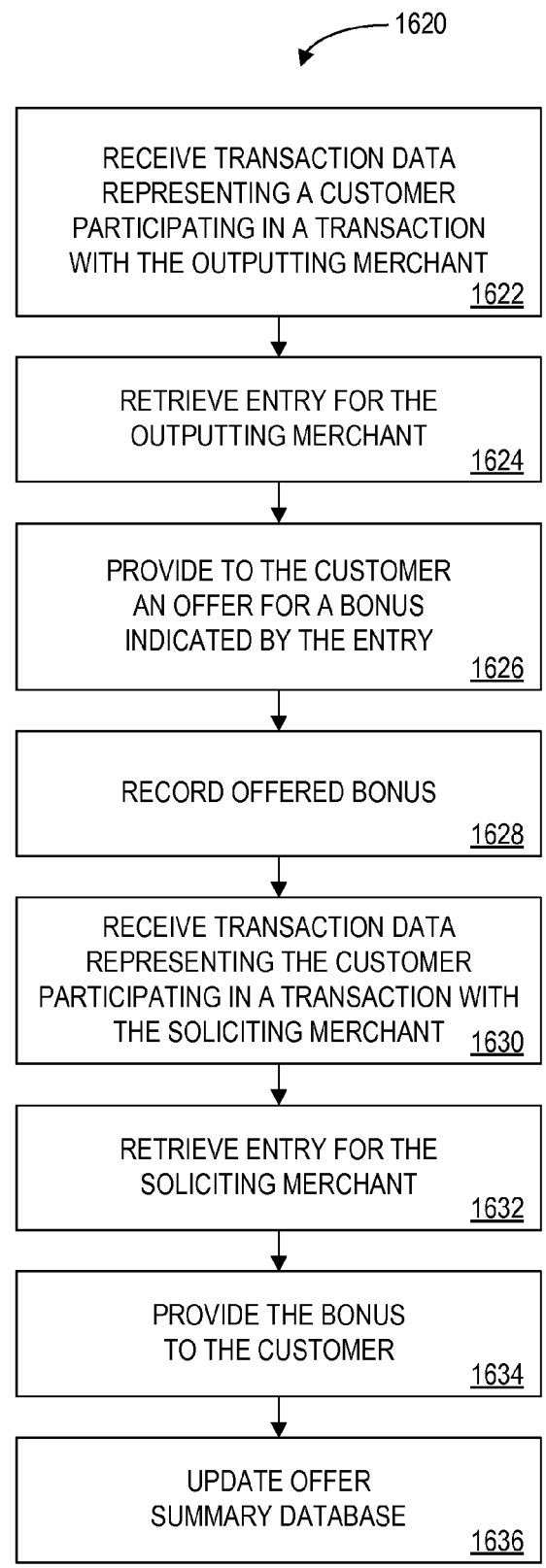

Referring to FIG. 16B, a flow chart 1620 illustrates an embodiment of a method for providing an offer for a bonus. The illustrated method is performed after an entry has been created as described above with reference to the flow chart 1600 (FIG. 16A). Transaction data that represents a customer participating in a transaction with the outputting merchant is received (step 1622). In response, an entry for the outputting merchant is retrieved (step 1624). For example, the offer criteria database 324 (FIG. 3) may be searched for entries that indicate the outputting merchant in the field 824 (FIG. 8). The entry indicates a bonus, and an offer for the bonus is provided to the customer (step 1626). Such an offer may include a text or graphic display to the customer, a text or graphic display to a cashier who in turn reads the offer to the customer, or an audio representation of the offer. Many other ways of providing the offer to the customer will be understood by those skilled in the art. The offered bonus is recorded (step 1628). For example, an appropriate entry may be created in the offer database 330 (FIG. 3).

Subsequently, transaction data that represents the customer participating in a transaction with the soliciting merchant is received (step 1630). In response, an entry for the soliciting merchant is retrieved (step 1632). For example, the offer database 330 (FIG. 3) may be searched for entries that indicate both the customer (e.g. by the field 1230) and the soliciting merchant (e.g. by the field 1228). The entry indicates the bonus, and the bonus is provided to the customer (step 1634). For example, a credit card account of the customer may be credited with an amount defined by the discount. In addition, the offer summary database 332 (FIG. 3) is updated to reflect the redeemed offer. The offer database 330 is also updated to reflect the redeemed offer.

Figure 17A:
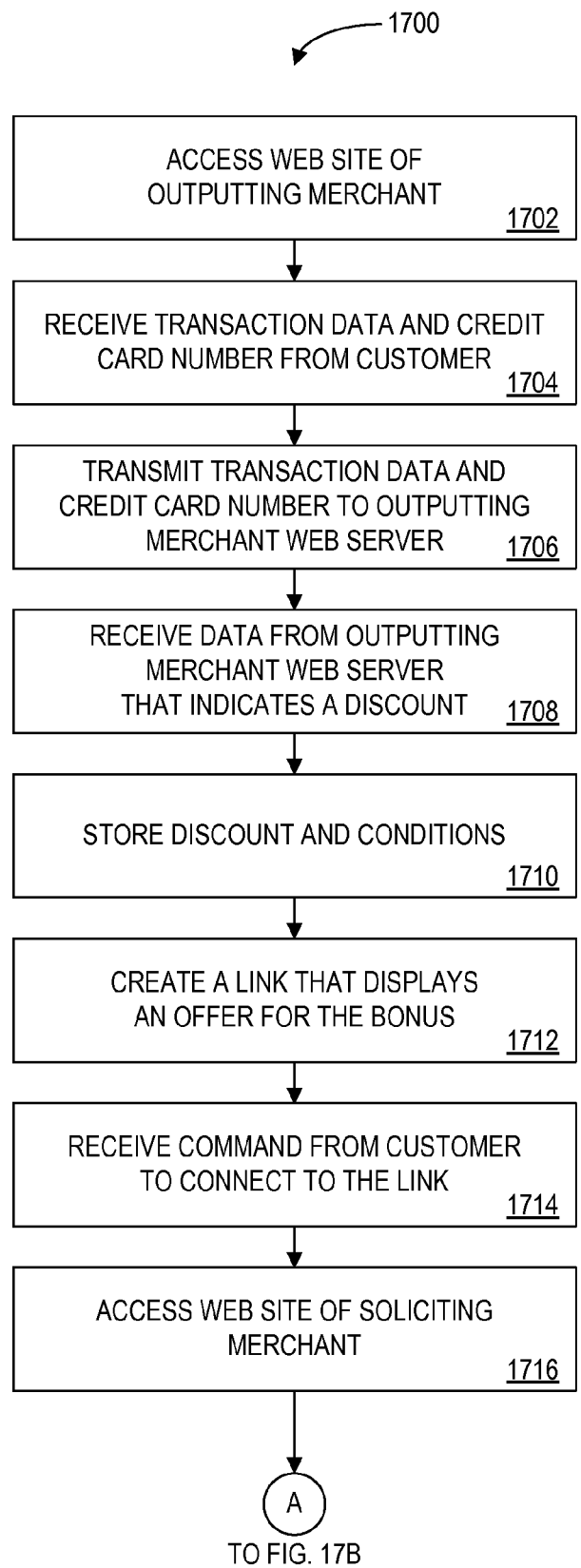
FIGS. 17A and 17B are a flow chart illustrating another embodiment of a method provided in accordance with the present invention.
Figure 17B:
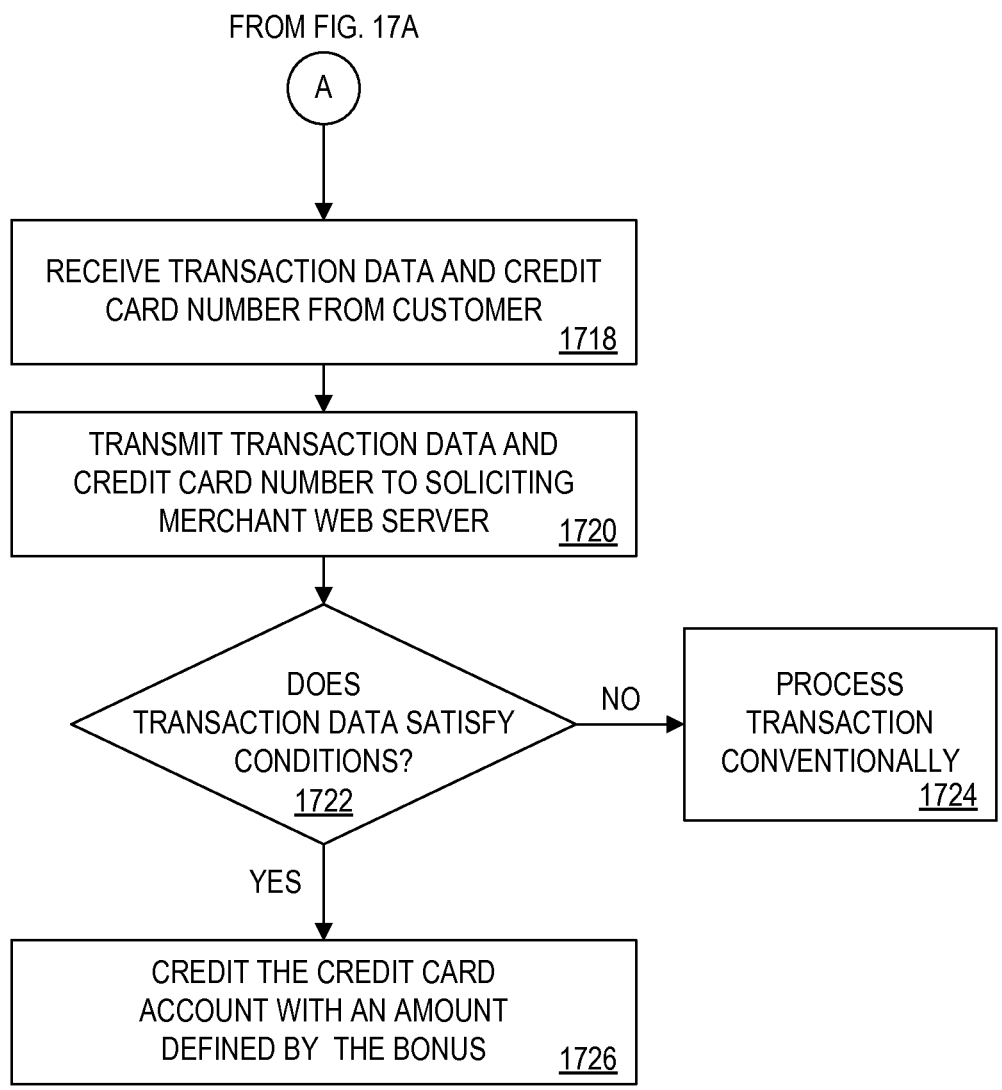

Referring to FIGS. 17A and 17B, a flow chart 1700 illustrates an embodiment of a method provided in accordance with the present invention. The steps of this method may be performed in whole or in part by "browser" software, such as Netscape's Communicator or Microsoft's Internet Explorer®, that is executed by the user computer 110 (FIG. 1).

The user computer 110 accesses the web site of an outputting merchant (step 1702) which allows customers to place orders online. The user computer 110 receives transaction data and a credit card number from the customer (step 1704), and transmits the transaction data and credit card number to the outputting merchant web server (step 1706). The credit card number identifies a credit card account that the customer has used to pay for the transaction. There are other ways besides identifying a credit card account to be charged in which the customer may render payment.

Once the outputting merchant web server receives the transaction data, it determines whether the customer has satisfied criteria, if any, to qualify for an offer for a bonus. If so, then the user computer 110 receives data from the outputting merchant web server that indicates the bonus (step 1708). The bonus and any associated conditions are stored (step 1710), for example, in a cookie or other file on the user computer 110 or on the Internet service provider computer 120 (FIG. 1). The conditions may also be stored on the soliciting merchant web server or the outputting merchant web server.

The user computer 110 creates (or receives) a link that displays an offer for the bonus (step 1712). The link may be a hyperlink, banner advertisement, additional frame, new window, or other element on the web site of the outputting merchant. Alternatively, the outputting merchant web server may alter the web site that is accessed by the user computer 110. If the customer wishes to take advantage of the offer and make a purchase from another (soliciting) merchant, the user computer 110 receives a command from the customer to connect to the link (step 1714) and thus access the web site of the soliciting merchant (step 1716).

The web site of the soliciting merchant likewise allows customers to place orders online. The user computer 110 receives transaction data and the credit card number from the customer (step 1718), and transmits this transaction data and credit card number to the soliciting merchant web server (step 1720). If the transaction with the soliciting merchant does not satisfy the conditions (step 1722), then the transaction is processed in a conventional manner (step 1724). Otherwise, the credit card account is credited (step 1726) with an amount defined by the bonus.

As described above, the bonus is applied to the customer account upon completion of a second transaction at the soliciting merchant. However, in another embodiment of the present invention, the customer may be further required to complete another transaction at the first merchant. Accordingly, the customer would have to participate in a first transaction at a first merchant, a second transaction at a second merchant, and then a third transaction at the first merchant. Although the customer may be required to meet certain conditions during the third transaction, typically the customer need not be so restrained.

Similarly, in another embodiment of the present invention the customer may be required to complete transactions at a plurality of soliciting merchants. Accordingly, the customer would have to participate in a first transaction at a first merchant, a second transaction at a second merchant, and then a third transaction a third merchant. The customer may be required to participate in any number of transactions in order to receive the offered bonus.

The routing of customers from an outputting merchant to a soliciting merchant may be based on the activity rate of the outputting merchant and/or the soliciting merchant. The activity rate may be any measure of "busyness", such as the number of completed transactions per time (transaction rate), the number of items purchased per period of time (item sale rate), the number of upsells accepted by customers per period of time (upsell acceptance rate), the number of customers in a store, the dollar-value of sales per period of time or the number of customers in the vicinity of a POS terminal. The number of customers may be measured through input signals received from a sensor. Many other types of measurements may be made to determine an activity rate of a merchant.

Figure 18:
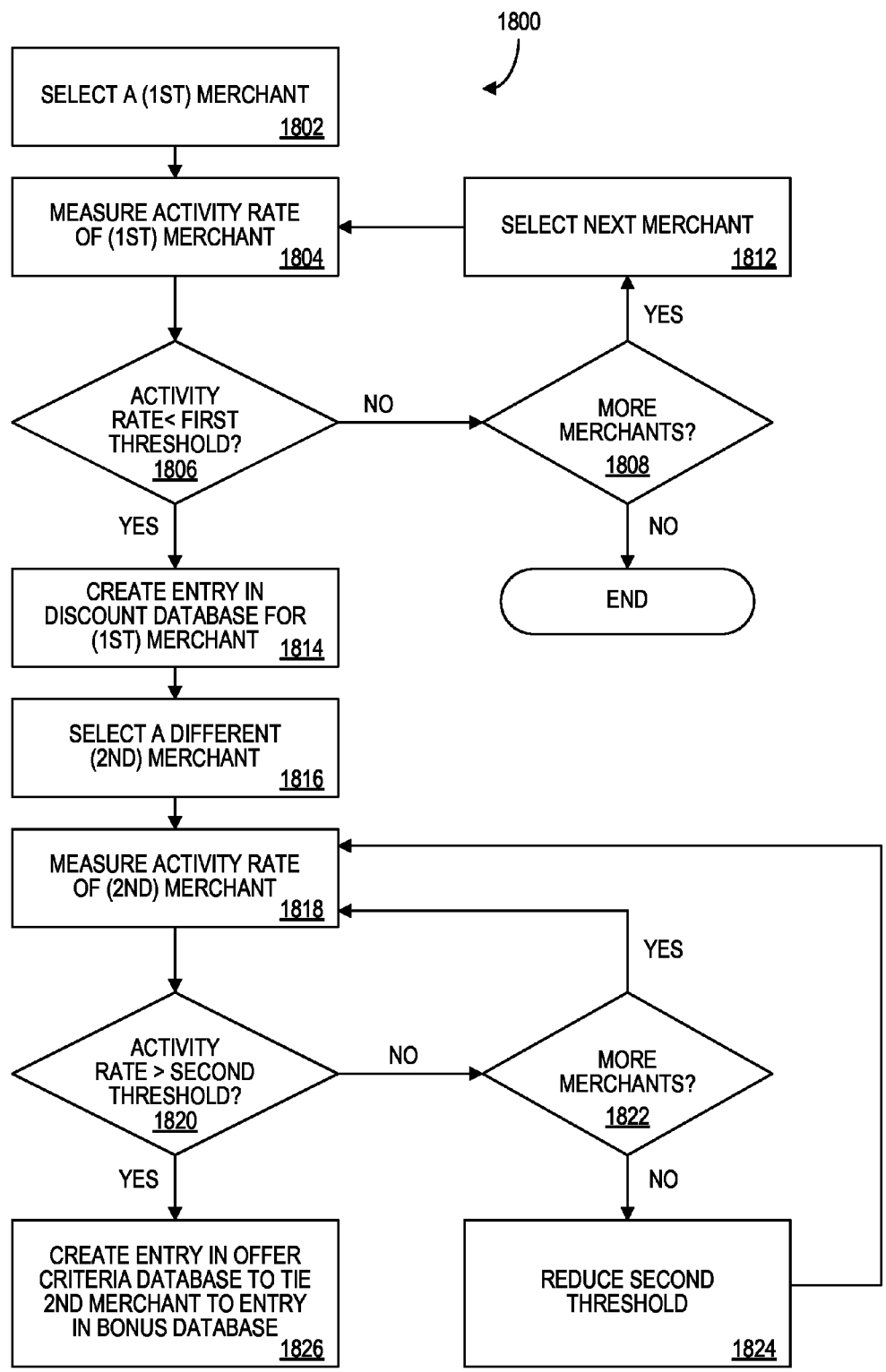
FIG. 18 is a flow chart illustrating another embodiment of a method provided in accordance with the present invention.

Referring to FIG. 18, a flow chart 1800 illustrates another embodiment of a method provided in accordance with the present invention. In particular, in the embodiment illustrated by the flow chart 1800 customers are routed from the outputting merchant to the soliciting merchant based on the activity rates of the outputting merchant and/or the soliciting merchant.

A first merchant is selected (step 1802), and its activity rate is measured (step 1804) to determine whether it is sufficiently idle to receive customers that are "routed" from other (outputting) merchants. The measurements may be made, for example, by a POS terminal with which customers are interacting, by another device in a store, or by a web server that measures the number of customer accessing a web site. The measurements or data indicative of the activity rate would then be transmitted to the server 210 (FIG. 2) via a store controller in communication with the POS terminal or other device. Alternatively, the measurements may be transmitted to the Internet service provider 120 (FIG. 1). The server 210 or Internet service provider 120 could measure the activity rate by receiving the measurement signal and/or by receiving transaction data (or other data) from which an activity rate can be measured.

If the measured activity rate is not less than a first predetermined threshold (step 1806), then the merchant is not considered sufficiently idle and it is determined if there is another merchant (step 1808) having an unmeasured activity rate. If so, the next merchant is selected (step 1812) and its activity rate is measured (step 1804).

If the measured activity rate is less than the first predetermined threshold, then the merchant is sufficiently idle. In response, in the bonus database 328 (FIG. 3) an entry is created that indicates the first merchant and a bonus value (step 1814). The entry may also include conditions, such as time of transaction, purchase price and/or item to purchase.

A second merchant different from the first merchant (i.e. the merchant whose activity rate was measured) is selected (step 1816), and its activity rate is measured (step 1818) to determine whether it is sufficiently busy to "route" customers to the first merchant. The measurements may be made, for example, by a POS terminal with which customers are interacting, by another device in a store, or by a web server that measures the number of customer accessing a web site. The measurements would then be transmitted to the server 210 (FIG. 2) via a store controller in communication with the POS terminal or other device. Alternatively, the measurements may be transmitted to the Internet service provider 120 (FIG. 1).

If the measured activity rate is not greater than a second predetermined threshold (step 1820), then the merchant is not considered sufficiently busy and it is determined if there is another merchant (step 1822). If there is no next merchant to select, then the second threshold is reduced (step 1824). The next merchant is then selected (step 1816) and its activity rate is measured (step 1818).

If the measured activity rate is greater than the second predetermined threshold, then the merchant is sufficiently busy. In response, in the offer criteria database 324 (FIG. 3) an entry is created that associates the aforementioned entry in the bonus database 328 with the second merchant (step 1826). This association effectively "ties" the second merchant to the entry in the bonus database 328.

The type of bonus offered may be, for example, a discount, another amount of monetary value or a free product (good or service). In other embodiments of the present invention, the bonus may be a line pass or other voucher that allows a customer to receive preferential treatment (e.g. not waiting in line). Many types of bonuses may be measured by a value. For example, the value of a discount is the amount by which a purchase price is reduced. Similarly, the value of a free product may be the retail price of the product, or the cost of the product to the business that sells the product. In accordance with the present invention, a business may establish a budget amount that defines the maximum aggregate value of all offered bonuses. Such a bonus amount may represent an amount of funds actually transferred to an account and reserved for funding discounts. Alternatively, the budget amount may represent a desirable spending limit of the business, while the business is subsequently charged for discounts that are redeemed.

Figure 19A:
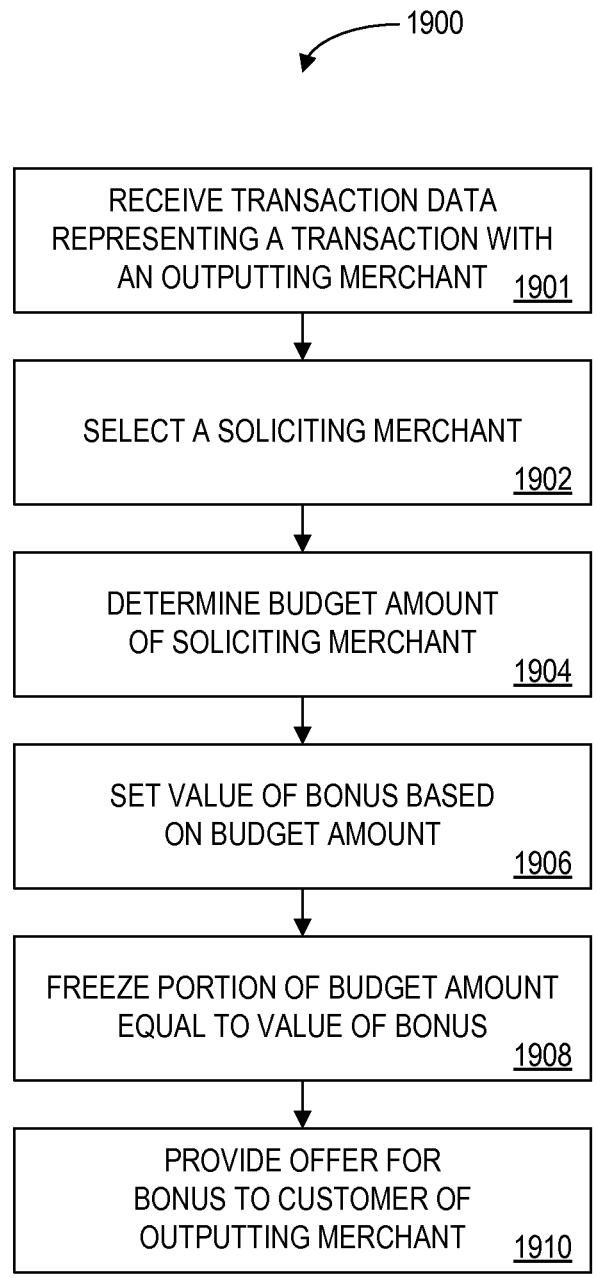
FIGS. 19A and 19B are a flow chart illustrating another embodiment of a method provided in accordance with the present invention.

Referring to FIG. 19A, a flow chart 1900 illustrates another embodiment of a method provided in accordance with the present invention. In particular, in the embodiment illustrated by the flow chart 1900 bonuses are provided in accordance with a budget amount of the business.

Transaction data that represents a customer participating in a transaction with an outputting merchant is received (step 1901). As described above, a soliciting merchant is selected (step 1902) to determine a bonus to be offered to the customer. The budget amount of the soliciting merchant is determined (step 1904). For example, the merchant database 322 (FIG. 3) may store the budget amount of the merchant (e.g. in the field 634 of FIG. 6). The value of the bonus is set based on the budget amount. In one embodiment, the bonus value is a predetermined value (e.g. $10.00) if the budget amount is at least as great as the predetermined value. If the budget amount is less than the predetermined value, then the value is set lower to remain with the limits of the budget amount. In another embodiment, the bonus value is set to a first value (e.g. $10.00) if the budget amount is greater than a second value (e.g. greater than $100.00), and the bonus value is set to a third value (e.g. $1.00) is the budget amount is less than the second value (e.g. less than $100.00). In this manner, the bonus value may be prudently allocated from the budget amount when a lower budget amount remains available.

A portion of the budget amount equal to the value of the bonus is "frozen" (step 1908); the portion is made unavailable for allocation of subsequent bonuses. Freezing may comprise reducing the budget amount by the frozen amount. Alternatively, freezing may comprise increasing the amount of a "frozen amount" balance and/or decreasing an "available amount" balance associated with the budget amount. An offer for the bonus is provided to the customer of the outputting merchant (step 1910) as described above.

Figure 19B:
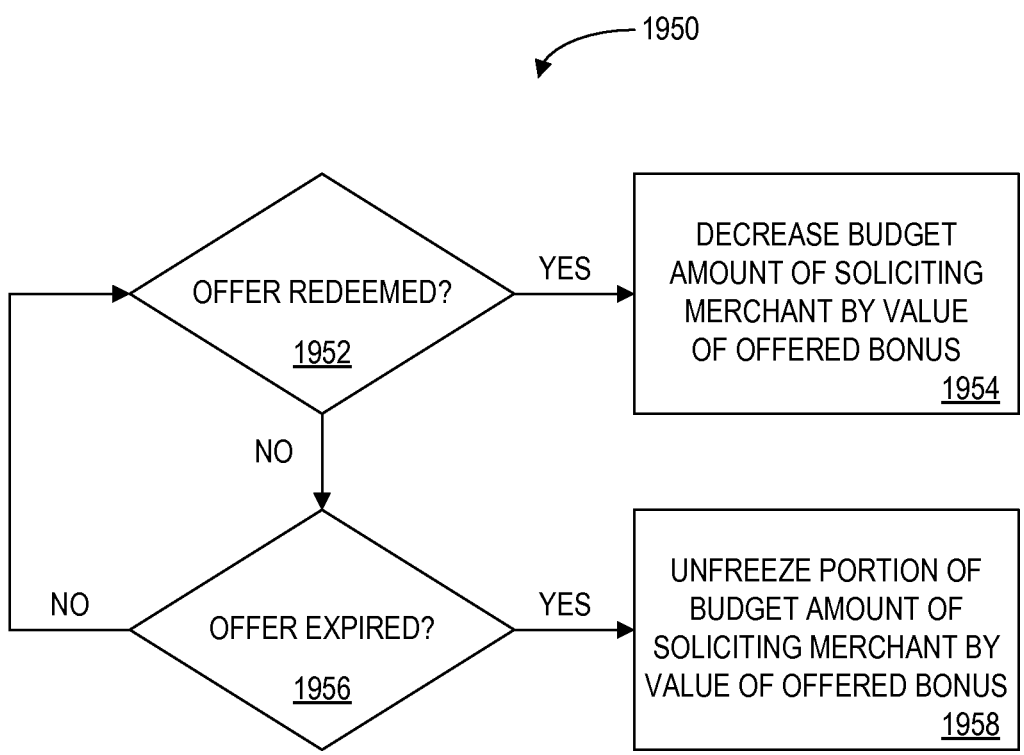

Referring to FIG. 19B, a flow chart 1950 illustrates another embodiment of a method provided in accordance with the present invention. In particular, the method illustrated by the flow chart 1950 is performed after the method illustrated by the flow chart 1900. The method illustrated by the flow chart 1950 may be performed periodically (e.g. every ten minutes) and/or upon occurrence of a predetermined event, such as when an offer is redeemed.

If the offer for the bonus is redeemed (step 1952), then the budget amount of the soliciting merchant is decreased by the value of the offered bonus (step 1954). In another embodiment in which the budget amount is decreased by a frozen amount, the budget amount may be unadjusted but a "frozen amount" balance may be decreased.

If the offer for the bonus is not redeemed, it is determined whether the offer has expired (step 1956). If so, the portion of the budget amount equal to the value of the bonus is unfrozen (step 1958). Unfreezing may comprise increasing the budget amount by the unfrozen amount. Alternatively, unfreezing may comprise decreasing the amount of a "frozen amount" balance and/or increasing an "available amount" balance associated with the budget amount.

A soliciting merchant may have to select from among several possible outputting merchants. The soliciting merchant will want to select the outputting merchant whose customers are most likely to redeem the offers of the soliciting merchant. In order to optimally select the outputting merchant, the historical redemption by the customers of various outputting merchants may be measured.

Figure 20:
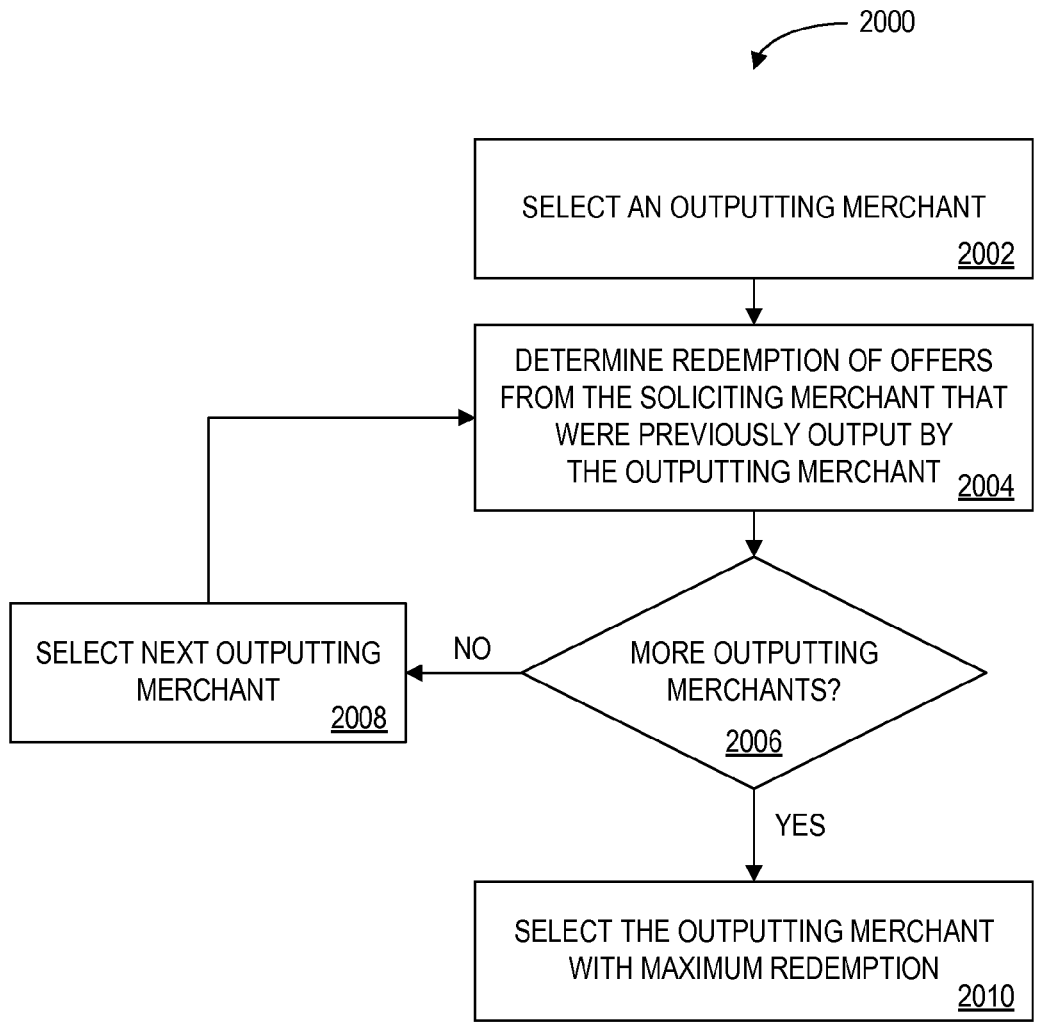
FIG. 20 is a flow chart illustrating another embodiment of a method provided in accordance with the present invention.

Referring to FIG. 20, a flow chart 2000 illustrates another embodiment of a method provided in accordance with the present invention. An outputting merchant is selected (step 2002) from the set of possible outputting merchants. Then, the redemption of offers that were output by this outputting merchant on behalf of the soliciting merchant is determined (step 2004). For example, such information on redemption may be stored in the offer summary database 332 (FIG. 3). If there are more outputting merchants (step 2006) whose redemption information must be measured, then the next outputting merchant is selected (step 2008) and processed. When all possible outputting merchants have been processed, the outputting merchant with the maximum redemption is selected (step 2010).

Figure 21:
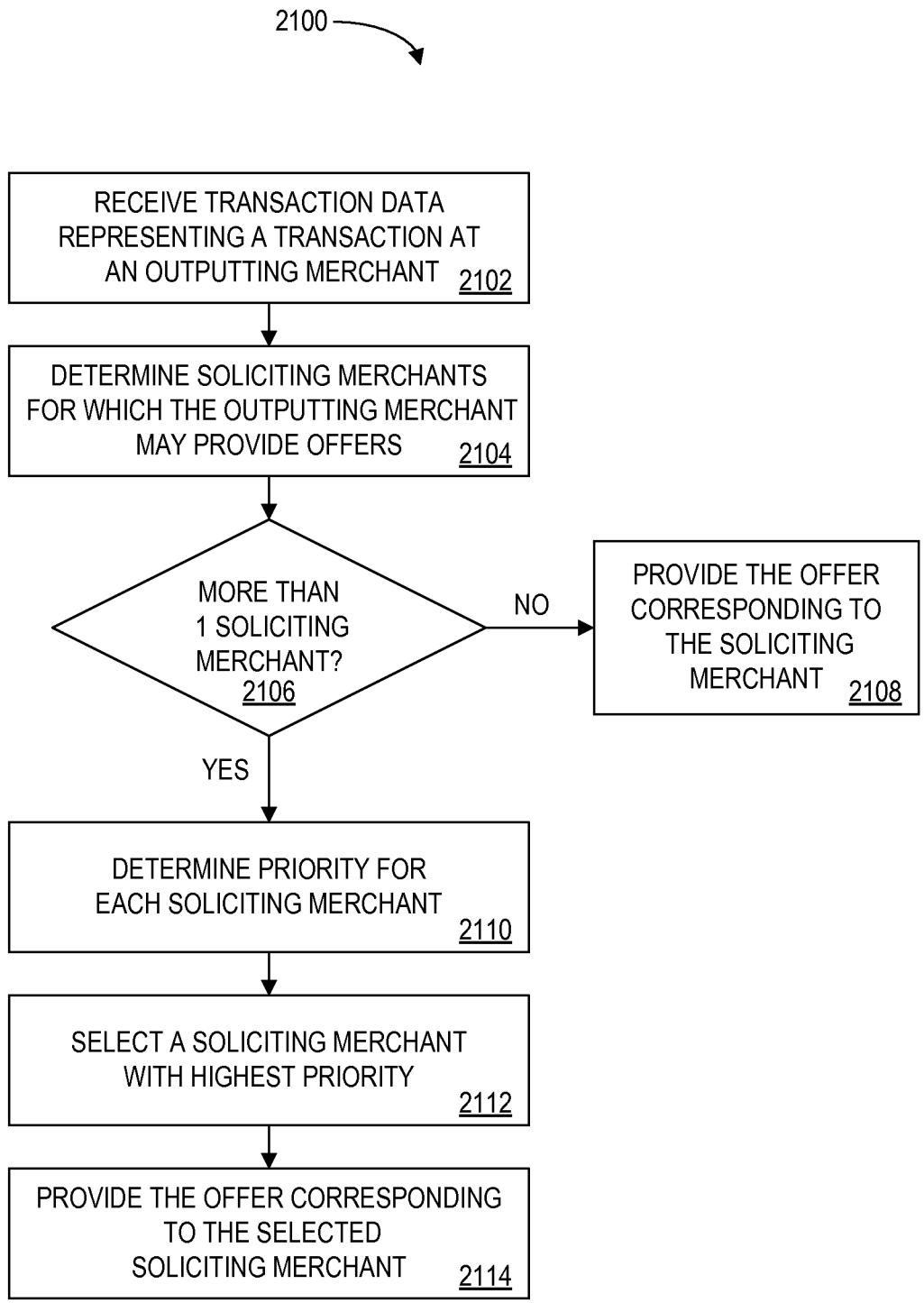
FIG. 21 is a flow chart illustrating another embodiment of a method provided in accordance with the present invention.

Referring to FIG. 21, a flow chart 2100 illustrates another embodiment of a method provided in accordance with the present invention. In particular, the illustrated method allows the selection of a soliciting merchant from among several possible soliciting merchants by referring to priority ratings of the soliciting merchants. The priority of each merchant may be established by an amount of funds paid by the merchant. For example, each merchant could be a charged larger amount of money in return for a higher priority. The priority of each merchant may also be established by one or more predetermined rules (e.g. stored in the priority database 326 of FIG. 3) or the activity rate of the merchant, as described above.

Transaction data that represents a customer participating in a transaction with an outputting merchant is received (step 2102). As described above, soliciting merchants for which the outputting merchant may provide offers is determined (step 2104). There may be restrictions on whether a merchant may be considered a soliciting merchant for which the outputting merchant may provide offers. One restriction is whether there is an appropriate entry in the offer criteria database 324 (FIG. 3). For example, there must be an entry having an indication of this outputting merchant in the field 824 (FIG. 8) and an indication of this soliciting merchant in the field 832 (FIG. 8). A further restriction may be specified by the field 722 (FIG. 7) described above. If there is not more than one possible soliciting merchant (step 2106), then the offer corresponding to the soliciting merchant is provided (step 2108) as described above.

If there is more than one possible soliciting merchant, then the priority of each soliciting merchant is determined (step 2110). For example, such priorities may be stored in the merchant database 322. The field 638 of FIG. 6 indicates a priority for each merchant. Alternatively, the field 726 of FIG. 7 indicates a priority for each soliciting merchant given a particular outputting merchant indicated by field 702. The soliciting merchant with the highest priority is selected (step 2112), and the corresponding offer is provided (step 2114).

In another embodiment, if there is more than one possible soliciting merchant, then a corresponding offer could be provided for each of a plurality of soliciting merchants. For example, the customer may be asked to select from two offers for bonuses. The customer could provide his selection, which would be recorded, and the selected offer would be provided, as described above. Alternatively, the customer could be provided with both offers. Accordingly, the customer could be possibly redeem one or both bonuses, as described above.

Figure 22:
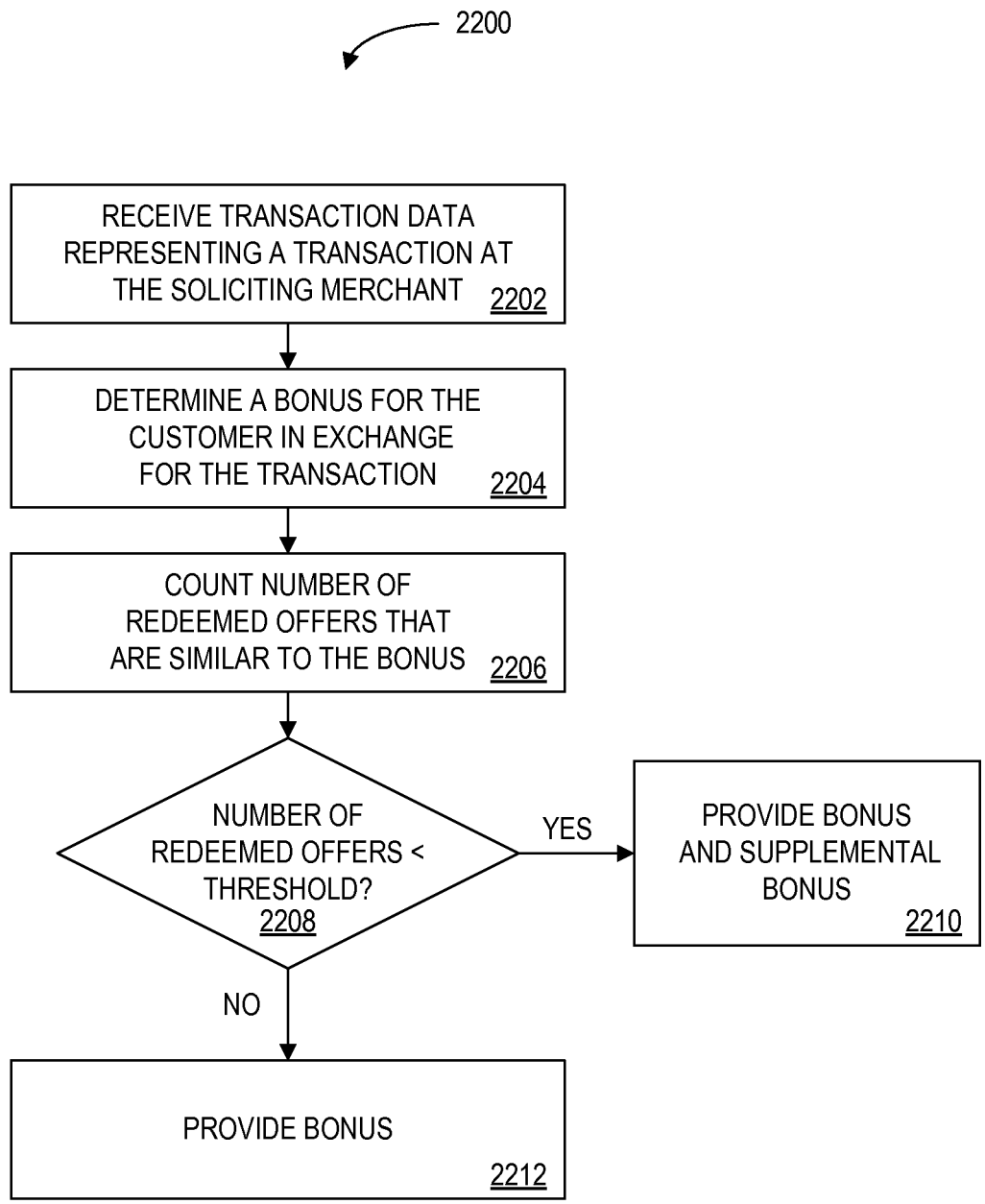
FIG. 22 is a flow chart illustrating another embodiment of a method provided in accordance with the present invention.

Referring to FIG. 22, a flow chart 2200 illustrates another embodiment of a method provided in accordance with the present invention. In particular, the illustrated method allows a supplemental bonus to be provided to certain customers. For example, if the customer redeems one of the first ten offers, he receives a supplemental bonus.

Transaction data that represents a customer participating in a transaction with an soliciting merchant is received (step 2202). Next, a bonus for the customer is determined (step 2204). The number of redeemed offers that are similar (or identical) to the bonus is counted (step 2206). For example, the offers that were output by the same outputting merchant and that were made on behalf of the same soliciting merchant may be deemed similar. Alternatively, only the offers that were made on behalf of the same soliciting merchant may be deemed similar.

If the number of redeemed offers is less than a threshold, then the bonus and a supplemental bonus are provided to the customer (step 2210). The supplemental bonus may comprise, for example, an increased discount or a free product. If the number of redeemed offers is not less than the threshold, then only the bonus is provided (step 2212).

In a related embodiment, if the customer redeems one of the first ten offers, he receives a bonus. Otherwise, customers are ineligible for the bonus. Accordingly, if the number of redeemed offers is less than the threshold, then the bonus is provided to the customer. However, if the number of redeemed offers is not less than the threshold, then no bonus is provided.

Although the present invention has been described with respect to a preferred embodiment thereof, those skilled in the art will note that various substitutions may be made to those embodiments described herein without departing from the spirit and scope of the present invention. For example, besides a purchase a soliciting merchant may also accept that the customer perform a number of different types of transactions, such as participating in surveys.

What is claimed is:

1. A method, comprising:
   receiving, by a server in communication with a plurality of store controllers, transaction data from a customer, the transaction data received via a store controller of an outputting merchant participating in a system for providing an offer for a bonus,
   the transaction data including an indication of a purchase by the customer of an item from the outputting merchant;
   selecting, by the server, a soliciting merchant from a plurality of soliciting merchants participating in the system for providing an offer for a bonus, the selection based on the purchase and at least one rule for determining a respective priority for each of the plurality of soliciting merchants;
   outputting an offer for a bonus to the customer of the outputting merchant on behalf of the soliciting merchant;
   determining, by the server, that the customer completed a second transaction with the soliciting merchant; and
   providing, via the server, the bonus to the customer.

2. The method of claim 1, in which receiving the transaction data comprises receiving the transaction data via a web site of the outputting merchant.

3. The method of claim 2, in which outputting the offer comprises transmitting a link to the customer for accessing the offer for the bonus.

4. The method of claim 3, wherein the link comprises at least one of a hyperlink, a banner advertisement, or a new window.

5. The method of claim 3, wherein the link provides access to a web site of the soliciting merchant.

6. The method of claim 1, in which receiving the transaction data comprises receiving the transaction data at a point of sale terminal.

7. The method of claim 1, in which outputting the offer comprises providing the offer to the customer at a point-of-sale of the outputting merchant.

8. The method of claim 7, wherein the offer for the bonus is provided in exchange for consummating a transaction with the soliciting merchant.

9. The method of claim 7, in which providing the offer comprises displaying the offer at the point-of-sale to the customer.

10. The method of claim 7, in which providing the offer comprises printing the offer at the point-of-sale on a receipt to be provided to the customer.

11. The method of claim 1, in which outputting the offer comprises providing the offer to a customer of the outputting merchant while the customer is accessing a Web site of the outputting merchant.

12. The method of claim 11, in which providing the offer comprises displaying an indication of the offer to the customer via the Web site.

13. The method of claim 12, in which displaying an indication of the offer comprises providing a hyperlink to a Web site of the soliciting merchant.

14. The method of claim 1, wherein the at least one rule is based on a class of soliciting merchant.

15. The method of claim 1, wherein the at least one rule is used to select the soliciting merchant with the highest priority.

16. The method of claim 1, wherein the at least one rule is active during a predetermined time period.

17. The method of claim 1, in which the at least one rule applies to an activity rate of the soliciting merchant.

18. The method of claim 1, wherein the at least one rule comprises a prioritization by merchant class.

19. The method of claim 1, wherein the at least one rule comprises a prioritization by an amount of funds paid.

20. The method of claim 1, further comprising:
determining that the customer completed a first transaction with the outputting merchant.

21. The method of claim 1, further comprising receiving an indication from a point of sale terminal that the customer accepted the offer.

22. The method of claim 21, further comprising:
receiving an indication that the customer completed a transaction with the soliciting merchant; and
providing the bonus to the customer.

23. The method of claim 1, further comprising, prior to outputting the offer for the bonus, determining that the customer satisfied predetermined criteria.

24. The method of claim 1, further comprising receiving a budget amount associated with the soliciting merchant and defining the maximum aggregate value of offered bonuses.

25. The method of claim 1, further comprising, prior to outputting the offer, determining a budget amount of the soliciting merchant.

26. The method of claim 25, further comprising setting the value of the bonus based on the budget amount.

27. The method of claim 25, further comprising freezing a portion of the budget amount, the portion based on a value of the bonus.

28. The method of claim 27, further comprising unfreezing the portion of the budget amount if the offer expires.

29. The method of claim 1, wherein the store controller of the outputting merchant comprises a computer directing an online store.

30. The method of claim 1, wherein the store controller of the outputting merchant comprises a web server.

31. A non-transitory computer readable medium for storing instructions configured to direct a processor to:
receive, by a server in communication with a plurality of store controllers, transaction data from a customer, the transaction data received via a store controller of an outputting merchant participating in a system for providing an offer for a bonus,
the transaction data including an indication of a purchase by the customer of an item from the outputting merchant;
select, by the server, a soliciting merchant from a plurality of soliciting merchants participating in the system for providing an offer for a bonus, the selection based on the purchase and at least one rule for determining a respective priority for each of the plurality of soliciting merchants;
output an offer for a bonus to the customer of the outputting merchant on behalf of the soliciting merchant;
determine, by the server, that the customer completed a second transaction with the soliciting merchant; and
provide, via the server, the bonus to the customer.

32. The computer readable medium of claim 31, in which the instructions for receiving transaction data comprise instructions configured to direct the processor to receive the transaction data at a web site of the outputting merchant.

33. The computer readable medium of claim 32, in which the instructions for outputting the offer comprise instructions configured to direct the processor to transmit a link to the customer for accessing the offer for the bonus.

34. The computer readable medium of claim 31, in which the instructions for receiving transaction data comprise instructions configured to direct the processor to receive the transaction data at a point of sale terminal.

35. The computer readable medium of claim 31, in which the instructions for outputting the offer comprise instructions configured to direct the processor to provide the offer to the customer at a point-of-sale of the outputting merchant.

36. The computer readable medium of claim 35, further comprising instructions configured to direct the processor transmit instructions to provide the offer for the bonus in exchange for the consumer consummating a transaction with the soliciting merchant.

37. The computer readable medium of claim 35, further comprising instructions configured to direct the processor transmit instructions to display the offer at the point-of-sale to the customer.

38. The computer readable medium of claim 35, further comprising instructions configured to direct the processor transmit instructions to print the offer at the point-of-sale on a receipt to be provided to the customer.

39. The computer readable medium of claim 31, in which the instructions for outputting the offer comprise instructions configured to direct the processor to provide the offer to a customer of the outputting merchant while the customer is accessing a Web site of the outputting merchant.

40. The computer readable medium of claim 39, in which the instructions for providing the offer comprise instructions configured to direct the processor to display an indication of the offer to the customer via the Web site.

41. The computer readable medium of claim 40, in which the instructions for displaying the offer comprise instructions configured to direct the processor to provide a hyperlink to a Web site of the soliciting merchant.

42. The computer readable medium of claim 31, in which the instructions for selecting the soliciting merchant further comprises instructions configured to direct the processor to apply a rule based on a class of soliciting merchant.

43. The computer readable medium of claim 31, in which the instructions for selecting the soliciting merchant further comprises instructions configured to direct the processor to select the soliciting merchant with the highest priority.

44. The computer readable medium of claim 31, in which the instructions for selecting the soliciting merchant further comprises instructions configured to direct the processor to apply a rule based on an activity rate of the soliciting merchant.

45. The computer readable medium of claim 31, in which the instructions for selecting the soliciting merchant further comprises instructions configured to direct the processor to apply a rule based on a prioritization by merchant class.

46. The computer readable medium of claim 31, in which the instructions for selecting the soliciting merchant further comprises instructions configured to direct the processor to apply a rule based on a prioritization by an amount of funds paid.

47. The computer readable medium of claim 31, further comprising instructions configured to direct the processor to:
determine that the customer completed a first transaction with the outputting merchant;
determine that the customer completed a second transaction with the soliciting merchant; and
provide the bonus to the customer.

48. The computer readable medium of claim 31, further comprising instructions configured to direct the processor to receive an indication from a point of sale terminal that the customer accepted the offer.

49. The computer readable medium of claim 48, further comprising instructions configured to direct the processor to:
receive an indication that the customer completed a transaction with the soliciting merchant; and
provide the bonus to the customer.

50. The computer readable medium of claim 31, further comprising instructions configured to direct the processor to, prior to outputting the offer for the bonus, determine that the customer satisfied predetermined criteria.

51. The computer readable medium of claim 31, further comprising instructions configured to direct the processor to receive a budget amount associated with the soliciting merchant and defining the maximum aggregate value of offered bonuses.

52. The computer readable medium of claim 31, further comprising instructions configured to direct the processor to, prior to outputting the offer, determine a budget amount of the soliciting merchant.

53. The computer readable medium of claim 52, further comprising instructions configured to direct the processor to set the value of the bonus based on the budget amount.

54. The computer readable medium of claim 52, further comprising instructions configured to direct the processor to freeze a portion of the budget amount, the portion based on a value of the bonus.

55. The computer readable medium of claim 54, further comprising instructions configured to direct the processor to unfreeze the portion of the budget amount if the offer expires.

56. The computer readable medium of claim 31, wherein the store controller of the outputting merchant comprises a computer directing an online store.

57. The computer readable medium of claim 31, wherein the store controller of the outputting merchant comprises a web server.

58. An apparatus, comprising:
a storage device; and
a processor operatively connected to the storage device, wherein the storage device includes a program configured to direct the processor to:
receive transaction data from a customer, the transaction data received by an outputting merchant participating in a system for providing an offer for a bonus;
receive transaction data from a customer, the transaction data received by an outputting merchant participating in a system for providing an offer for a bonus,
the transaction data including an indication of a purchase by the customer of an item from the outputting merchant;
select a soliciting merchant from a plurality of soliciting merchants participating in the system for providing an offer for a bonus, the selection based on the purchase and at least one rule for determining a respective priority for each of the plurality of soliciting merchants;
output an offer for a bonus to the customer of the outputting merchant on behalf of the soliciting merchant;
determine that the customer completed a second transaction with the soliciting merchant; and
provide the bonus to the customer.

* * * * *